United States Patent [19]
Brewer

[11] Patent Number: 6,015,105
[45] Date of Patent: Jan. 18, 2000

[54] MACHINE AND METHOD FOR REMOVING TREAD MATERIAL FROM USED MOTOR VEHICLE TIRE AND PRODUCING RECYCLABLE BUFFINGS

[75] Inventor: John C. Brewer, Salt Lake City, Utah

[73] Assignee: Garb-Oil & Power Corporation, Salt Lake City, Utah

[21] Appl. No.: 09/066,084

[22] Filed: Apr. 24, 1998

[51] Int. Cl.[7] .................................................. B02C 19/12
[52] U.S. Cl. .......................... 241/30; 241/279; 241/280; 241/DIG. 31
[58] Field of Search ........................... 241/DIG. 31, 277, 241/279, 280, 30, 293, 294, 295

[56] References Cited

U.S. PATENT DOCUMENTS

| | | |
|---|---|---|
| 2,937,676 | 5/1960 | Smyser . |
| 3,578,252 | 5/1971 | Brewer . |
| 3,614,969 | 10/1971 | Breiner . |
| 3,693,894 | 9/1972 | Willette . |
| 4,813,614 | 3/1989 | Moore et al. . |
| 5,115,983 | 5/1992 | Rutherford ........................ 241/DIG. 31 |
| 5,299,748 | 4/1994 | Brewer . |
| 5,482,215 | 1/1996 | Veres ................................ 241/DIG. 31 |
| 5,590,838 | 1/1997 | Brewer . |

FOREIGN PATENT DOCUMENTS 8803866  6/1988  WIPO .

*Primary Examiner*—Mark Rosenbaum
*Attorney, Agent, or Firm*—Mallinckrodt & Mallinckrodt

[57] ABSTRACT

A machine, a method, and an air-cooled cutting brush for removing tread material for recycling from used motor vehicle tires prior to scrapping or retreading without damaging the tire cords and beads. The tread material is removed as fine particles, or buffings, ready for recycling without subsequent sorting out of cloth or metal. A tire is mounted in an upright position on a tire receiving assembly which expands to grip the tire beads. The tire receiving assembly is mounted on a supporting structure which pivots. An elongate, powered, rotating, cutting brush is mounted on a rolling mounting structure which moves the cutting brush into and out of engagement with the tread on the outer, ground-contacting portion and on the sidewalls of a tire. In operation, the tire is rotated as the cutting brush engages the tread material of the ground-contacting portion, the supporting structure is then pivoted to remove the tread material of one sidewall, and repeated on the opposite sidewall. The cutting brush is maintained at a temperature below the melting point of the tread material by radially-extending bristles that are twisted and crimped along their length to allow bristles to abut or engage other bristles and allow air circulation between the bristles and to provide even cutting. The machine can be mounted on a tractor-trailer rig for mobile operation, the cutting brush being powered by an internal combustion engine with the tractor having retractable stabilizer arms and a crane to lift tires. A retractable screw auger deposits removed tread material into a container beside the trailer.

19 Claims, 26 Drawing Sheets

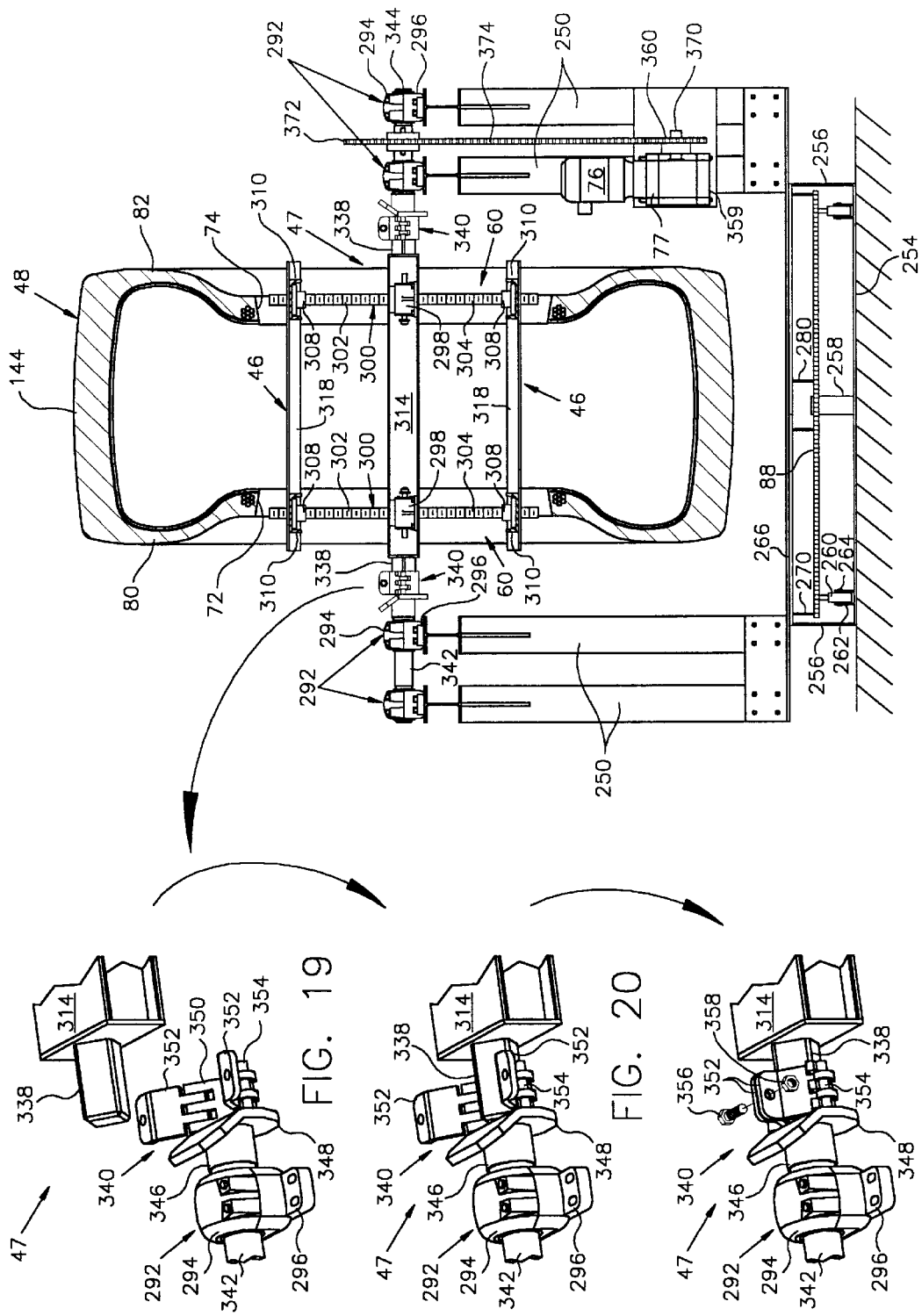

MACHINE AND METHOD FOR REMOVING TREAD MATERIAL FROM USED MOTOR VEHICLE TIRE AND PRODUCING RECYCLABLE BUFFINGS

BACKGROUND OF THE INVENTION

1. Field

The invention is in the field of machines and methods which utilize a rotating cutter that engages a slowly rotating used motor vehicle tire to remove tread material from the tire for recycling of such tread material in preparation for tire disposal or retreading.

2. State of the Art

Various types of vehicle tire cutting or shredding machines and methods for use thereof have been developed to remove chunks of tread material and tire core (i.e. cords) from used vehicle tires or for complete shredding thereof for disposal or recycling. Reference is made to my U.S. Pat. Nos. 5,299,748 and 5,590,838 which describe several such prior art shredding machines that typically completely shred used tires into relatively large pieces of about four inches long by four inches wide by one-half inch thick, requiring subsequent processing thereof prior to recycling for separation of the cloth and metal of the tire cords and tire bead components from the recyclable tread material. Shearing of such tires also makes transport thereof easier, requiring less space to transport. Such shearing-type machines, however, are only economically feasible to shear tires of up to the size of standard automobile tires. Other types of machines have been used to remove tread material from used tires, including those using a narrow, cylindrical wire cutting brush having a hub and radially-extending wire bristles. Such a brush is about one and one-half to three inches wide by about ten to twenty inches in diameter, and is reciprocated during use so as to reach the full width of the tire tread material. Applicant is not aware of any prior art brushes comprising a plurality of this type of brush formed by placing side-by-side multiple narrow brushes so as to form a wider brush.

In such U.S. Patents I disclose and claim a machine and method for cutting tread material from the outer, ground-contacting portion of large, used, off-road industrial vehicle tires and for completely disintegrating tires by cutting, including the sidewalls thereof. A tire to be cut is mounted in an upright position on a motor driven, rotating, tire holder assembly of the machine, which expands to grip the tire beads and rotates the tire. The tire holder assembly is held on the supporting structure by means of an arbor thereof which extends through such tire holder assembly. The tire holder assembly is rotatably chain driven by a motor attached to the supporting structure. A powered, elongate, rotating, cutting blade assembly, having a series of staggered, chisel-type, cutting blades, is rotatably mounted on a rolling mounting structure in a horizontal position laterally of the mounted tire. The cutting blade assembly is rotatably driven at a higher speed than the tire holder assembly by a motor attached to the mounting structure. As the tire is rotated, the cutting blades remove relatively large pieces of tire similar to the shredding machines. These pieces are ready for direct disposal, such as in a landfill, or for further processing for recycling, such as by liquid nitrogen freezing, followed by crushing into crumb rubber, and sorting out of the recyclable tread material from the cloth and metal. While my prior machine and other prior art shredding machines are capable of cutting whole tires into pieces, the pieces are not readily recyclable, and the machines are not well suited or capable of removing only the tread material for recycling or to prepare tires for adding new tread material thereto (i.e. retreading). Also, such machines require the tires to be brought to the location of the machine, which is more costly than if the machine could be brought to the location of the tires.

When removing tread material for recycling, or preparing tires for retreading, using my prior machine and method, only the tread material on the outer, ground-contacting portion of the tire is removed, this by making one or more rough cuts with the cutting blades. Such rough cuts are stopped short of the tire cords and sidewalls. Additional tread material can be removed by replacing the cutting blades with an elongate, rotatable, cylindrical cutting brush having straight, radially-extending wire bristles for removing additional tread material without damaging the tire cords. The tread material removed by such brush is in the form of "shards", which are about one-eighth to one-quarter inch wide, of varying thickness, and up to several inches long, which contain very little cord material. The brush prepares the outer, ground-contacting portion of the tire for retreading by producing a smoother, slightly roughened surface compared to the blades. However, tread material on the sidewalls cannot be reached by the cutting blades nor by the brush without damaging the tire cords, because the brush and the tire cannot pivot relative to one another such that the cutter and brush can engage the tread material on the sidewalls. Likewise, applicant is not aware of any prior art machines in which the cutter or the tire supporting structure can be pivoted so as to facilitate cutting the tread material from the tire sidewalls.

The removal of tread material using the cutting brush is a relatively slow process compared to using the cutting blades, since the brush removes only "shards" from the tire and since this process must be done at a relatively slow brush speed of about 450 to 900 revolutions per minute (RPM) due to the frictional heat build-up in the brush as the bristles contact the tread material. As the frictional heat builds, the tread material softens, and if the temperature reaches the melting point of the tread material, the tread material melts onto the brush bristles and no longer comes off of the tire as solid chips, thus ruining the brush, and prohibiting further tread material removal from the tire until the brush and tread material are cooled to a temperature below the melting point of the tread material. One such method of preventing the excessive build-up of heat is by spraying liquid nitrogen onto the tread material ahead of the brush so as to freeze the tread material. This method also allows the brush to be run at higher RPM's for quicker tread material removal. However, such a process using liquid nitrogen or other liquid gas is more costly due to the cost of the gas and typically requires more elaborate equipment including an insulating hood to cover the tire.

Rotatable brushes having radially extending bristles are known in various arts and have been used in various machines including floor sweepers, paint removal devices, and in the machine of my prior-mentioned patents. However, the bristles on such brushes are generally straight members made of metal, or plastic, extending radially from a hub. More recently, rotating brushes having radially extending bristles which are crimped along their length and twisted, which crimps can engage or abut adjacent bristles so as to maintain the bristle ends spaced apart have been developed for use in various applications wherein a more even bristle distribution is desired at the outer surface of the rotating brush to produce a more even cut. While such brushes having radial bristles are well known, modifications thereof for the purposes of the present invention appear to be new. In particular, applicant is not aware of any brushes having such twisted, crimped bristles which are used for cooling purposes due to an increased air space and flow between the bristles.

SUMMARY OF THE INVENTION

In accordance with the invention, a machine and method for removing tread material, such as rubber compounds, prior to scrapping, recycling, or retreading such used motor vehicle tires without damaging the tire cords. The tread material is preferably removed as fine particles, or strings of tread material, called buffings, containing mostly tread material with little or no tire cord, of about one thirty-second to one sixteenth inch square, and smaller, and by up to about several inches long. Such buffings are suitable for direct recycling without further processing such as for making running tracks, pick-up truck liners, and walking blocks for walking paths. The invention also includes a rotating, preferably air-cooled, cutting brush for use with the machine, which brush has bristles which can abut or engage adjacent bristles, such as by a spacing means of the bristles, which maintain the ends thereof in a spaced relationship. The invention is an improvement on the machine, brush, and method of my previous U.S. Pat. Nos. 5,299,748 and 5,590,838, which are hereby incorporated by reference into the present specification.

The machine of the invention comprises a tire holding means, a supporting structure, a tire-operative means, and a mounting structure. The tire holding means functions to receive a tire, grip the tire beads to hold the tire thereon, and is powered so as to slowly rotate the tire about its rotational axis as the tire-operative means removes tread material therefrom. The tire can be held with its rotational axis in any orientation from horizontal to vertical. The tire holding means can be made in any of a number of configurations, preferably the jack-operated, expanding tire holder assembly described in my prior-mentioned patents. Such tire holder assembly extends through the tire and includes a pair of dual jacks connected at opposite ends by rectangular frames. The dual jacks are connected at the mid-portions thereof to an elongate arbor which removably couples to a pair of spaced apart, journaled shafts of the supporting structure. The dual jacks are manually operated to move the frames further apart and against the tire beads so as to grip and hold the tire relative to the arbor. Multiple of such tire holder assemblies can be designed for use with different size tires on the machine, which can be quickly interchanged. While this type of tire holding means is preferred, other tire holding means can be used on the machine including but not limited to those having tire clamping devices that do not expand, but rather grip the tire like a vice, or those that are cantilevered, being supported only at one end thereof by the supporting structure.

The tire holding means is rotatably mounted to the supporting structure, which is itself supported by a structural base such as a building floor, trailer bed, or other stable platform. The tire holding means is rotationally powered by means of a hydraulic motor, or by, preferably, an electric motor attached to the supporting structure. The supporting structure can be constructed so as to be movable linearly, arcuately, pivotally, or some combination thereof during operation. This can be done such as by building into the supporting structure a pivotable turntable, or by including wheels and a pair of straight or arcuate rails for the supporting structure to roll on, which rails are attached to the structural base, or by using a combination thereof. Straight rails permit the supporting structure with tire holding means to roll in a straight line toward and away from the tire-operative means and mounting structure, whereas arcuate rails allow the supporting structure and tire holding means to move in a curved motion relative to the tire-operative means and mounting structure.

The tire-operative means is attached to the mounting structure, itself being supported by the structural base. The tire-operative means functions to remove tread material from the tire and includes a portion that moves relative to the tire tread material, such as by oscillating or preferably by rotating, being powered by a hydraulic motor, or by, preferably, an electric motor or an internal combustion engine. The tire operative means preferably produces buffings from the tread material which contain mostly tread material, though larger-sized particles of tread material which can include cord material can also be produced depending on the particular tire-operative means. The mounting structure can be constructed so as to be movable linearly, arcuately, pivotally, or some combination thereof during operation. This can be done such as by building into the mounting structure a turntable for pivoting, or by including wheels and a pair of straight or arcuate rails for the mounting structure to roll on, which rails are attached to the structural base, or by using a combination thereof. Straight rails allow the mounting structure with tire-operative means to roll in a straight line toward and away from the tire on the tire holding means and supporting structure, whereas arcuate rails allow the mounting structure and tire-operative means to move in a curved motion relative to the tire, tire holding means, and supporting structure.

An important feature of the machine of the invention is that the supporting structure with rotating tire holding means, the mounting structure with tire operative means, or both are movable, as stated above, to permit the tire and the tire-operative means to be operationally positionable relative each other. This position-ability permits the tire operative means to reach and remove tread material from not only the outer, ground-contacting portion of the tread material, but also from the tread material on both tire sidewalls, a feature prior art machines do not have. This allows more tread material to be removed for recycling and better prepares the tire surface for retreading, by removing such tread material from the sidewalls of the tire.

In the preferred embodiment of the machine, the tire is held in a generally upright position by the tire holding means and supporting structure, which tire holding means comprises the arbor-mounted, jack-operated, expanding tire holder assembly of the type as in my prior-mentioned patents. The machine is mounted on a bi-level structural base having an upper and a lower level, such as a concrete floor or trailer bed. The supporting structure includes a turntable that is supported by the lower level of the structural base, and to which is attached a support frame having pairs of upwardly extending frames on each side of the tire for supporting a pair of journaled, horizontally spaced apart, coaxial shafts, each having a coupling to support respective ends of the arbor of the tire holder assembly. The supporting structure is pivotable about a vertically-oriented pivot axis, preferably extending through the tire near the axial center thereof, such that the tire can rotate about a rotational axis in a generally horizontal plane and pivot in both lateral directions. The turntable and tire holder assembly are powered by means of a hydraulic motor, or by, preferably, electric motors.

The mounting structure of the preferred embodiment comprises a frame having a vertical portion to which an elongate, rotatable cutting portion, or member of the tire-operative means is rotationally mounted in a generally horizontal orientation, a wheel-equipped horizontal portion, and a pair of rails attached to the upper level of the structural base that overhang and are supported by the lower level of the structural base. The mounting structure and tire-operative means comprise a rolling brushing unit which can move in a linear fashion toward and away from the tire and the tire holder assembly. The bi-level structural base permits the vertical height of the center of the brush and the center of a tire to coincide such that the pressure of the brush bristles against the tire is normal to the tire surface for optimal production of buffings. The mounting structure further includes a shroud and collector that direct tread material particles removed from the tire into a screw auger of the mounting structure, which screw auger is powered by a hydraulic motor, or by, preferably, an electric motor, and which moves the particles of tread material to a suitable container or conveyor belt. The mounting structure is preferably movable by screw drive thereof, which includes a hydraulic motor, or preferably, an electric motor, and which drives a ball screw drive, fixedly connected at one end, such as to the structural base, and connected to the rolling brushing unit by means of the screw thereof, engaging a nut on the rolling brushing unit. In this preferred embodiment of the invention, the tire is pivotable on the turntable, and the mounting structure with cutting brush moves linearly. This arrangement is preferred because it is easier to construct and more cost-effective than having the cutting brush on the mounting structure pivot relative to the tire and supporting structure.

The operative means of the preferred embodiment includes the elongate, rotatable cutting member comprising a cutting brush having cutting members in the form of axially-extending, twisted, crimped bristles made of steel, which remove tread material, in the form of buffings, without damaging the tire cords and sidewalls. The spacing means in such bristles is the crimping wherein such crimped portions of adjacent bristles can abut, or engage each other, with such bristles preferably having straight outer ends, so as to maintain such bristles outer ends in such a relatively evenly-spaced relationship longitudinally and circumferentially, especially when force is applied thereto, more effectively than with straight bristles. The twisted, crimped bristles provide a rougher outer surface to the cutting brush than prior art wire brushes since the bristle ends are held in a spaced relationship so as to remove tread material more quickly, and leaving a rougher surface which is preferable for retreading purposes. Such cutting brush can be sized according to the tire size, being such as about fifteen inches in diameter and about sixty inches in length for use on the tires of larger off-road motor vehicles such as those weighing about eighteen thousand pounds. The length of the cutting brush is preferably of equal or greater length than the width of the tread material to be removed at the outer, ground-contacting portion of the tire, allowing the tread material of the entire width thereof to be removed simultaneously. Such brush length also allows separate removal of tread material from the entire width of a sidewall of the tire simultaneously. Adjacent bristles can abut or engage each other so as to provide a generally even distribution of bristles for even cutting and which bristles allow the flow of air therebetween to dissipate frictional heat generated during operation. Heat is dissipated effectively so as to not melt the tread material at rotational speeds higher than possible with straight bristle cutting brushes, such that liquid nitrogen cooling of the tread material is generally not necessary. The buffings produced from the tire by such cutting brush comprise mostly tread material, so as to negate the need for subsequent sorting out of cloth and metal cord and bead particles as required by previous shredding and cutting machines, prior to recycling of the tread material. The size of the buffings is controlled by how quickly the cutting brush is fed toward the tire tread material by the electric screw drive, or in other words by how much force is applied to the bristles against the tire tread, and by the relative rotational speeds of the cutting brush and the tire. The faster the feed rate, the coarser the buffings. Other brush designs may be used with the machine, preferably which remove tread material from the tire without damaging the tire cords and sidewalls, including those with straight wire bristles. Such brushes, however, are primarily for use at slower rotational speeds so as to not soften or melt the tread material. It should be noted that while the spacing means in the preferred brush is crimped, twisted bristles which can abut or engage each other by means of adjacent bristle crimps abutting each other, other spacing means may be used including washers, tubes, and the like placed on straight bristles radially inwardly of the outer ends thereof, which serve to maintain the bristle ends in a relatively even circumferential and longitudinal distribution.

The machine, method, and cutting brush can be adapted for use on most any size vehicle tire, with the tires used on large off-road vehicles being particularly desirable, due to the higher natural rubber content of the tread material compared to that of standard-sized truck and automobile tires, since natural rubber is more expensive to produce than the synthetic rubbers also used in motor vehicle tires and thus more desirable to recycle.

A first, fixed version of the preferred embodiment of the invention is permanently or semi-permanently located such as at a tire retreading, recycling, or scrapping facility. The structural base for the machine at such facility is typically a bi-level concrete or metal floor, to which the machine is affixed such as by bolting into the floor. Electric motors preferably power the tire holder assembly, the turntable, the cutting brush, the screw drive, and the auger since electricity is readily available at most facilities, though hydraulic motors may also be used in facilities having hydraulic pump systems. In such fixed installation, the buffings can be directed by the brush shroud and collector into a container positioned below the machine, or into a fixed or retractable screw auger, or onto a conveyor belt leading to a container for recycling of the buffings. Such a retractable screw auger rolls on rails such that it can be used in the extended position, but retracted into a stored position during non-use or for transport such as prior to installation.

A second, mobile version of the preferred embodiment of the invention is mounted to the steel bed of a bi-level trailer such as that of a fifth-wheel tractor-trailer rig, such that the removal of tread material can be done where the tires are located rather than the more costly transporting the tires to the machine location. The structural base for such version is the bi-level metal bed of the trailer, to which the machine is affixed, such as by bolting to the bed. In such version, electric motors preferably power the tire holder assembly, the turntable, the screw drive, and the auger, with electricity being supplied by means of an internal combustion engine-driven generator mounted to the end portion of the trailer. An internal combustion engine, preferably a diesel engine, powers the cutting brush, though an electric motor could be used but would require the electric generator to be much larger in order to supply the necessary electrical current. Hydraulic motors can be used in place of the electric motors, with the engine-driven electrical generator replaced by an engine-driven hydraulic pump. In such mobile version, the buffings exiting the collector can be directed into a retractable screw auger leading to a container positioned at the side of the trailer during operation, with the screw auger being moved to a retracted position completely within the trailer width during transport.

The fifth wheel tractor for use with the machine and trailer preferably includes a built-in, pivotable crane and retractable side stabilizer arms. The crane is used to lift tires onto and off of the machine, with the stabilizer arms steadying the tractor. A removable floor panel on the fifth wheel tractor can be positioned over the fifth wheel trailer attachment disk, when disconnected from the trailer, for added room to work on, to process, or to haul tires. A loading area at the rear portion of the trailer, between the turntable and the electrical generator, provides an area for placing the tire during loading and unloading of the tire from the machine.

THE DRAWINGS

The best mode presently contemplated for carrying out the invention is illustrated in the accompanying drawings, in which:

FIG. 1 is a perspective view of a first version of a preferred embodiment of the machine of the invention which is fixed in a permanent location, and shown with a tire mounted thereon;

FIG. 2, a side elevational view of such first version, with the belt and the chain covers removed;

FIG. 3, a top plan view of such first version, with the brush shroud removed, showing the positions of the brush and the tire, and with the screw auger extended;

FIG. 4, an end view of such first version showing the motor and pulley drive system, which powers the brush, the motorized chain drive system, which rotates the tire, and the screw auger extended;

FIG. 5, a perspective view of the rolling brushing unit and the collector, with the auger extended to show the discharge therefrom into a container;

FIG. 6, a side elevational view of the rolling brushing unit taken on the line 6—6 of FIG. 3 showing the pulley drive system;

FIG. 7, an end view of the rolling brush unit taken on the line 7—7 of FIG. 6;

FIG. 8, an opposite end view of the rolling brushing unit taken on the line 8—8 of FIG. 6;

FIG. 9, a partially broken, lateral, horizontal sectional view, taken on the line 9—9 of FIG. 8, showing mounting and internal structure of the brush;

FIG. 10, an enlarged, fragmentary view taken on the line 10—10 of FIG. 9 showing the internal structure of the brush;

FIG. 11, an enlarged fragmentary view of a single brush holder disk with multiple brush bristles;

FIG. 12, a similar enlarged view of a single brush bristle;

FIG. 13, a top plan view corresponding to FIG. 3 but with the turntable and tire rotated to allow the brush to reach the sidewalls of the tire;

FIG. 14, a fragmentary side elevational view, taken on the line 14—14 of FIG. 3, showing the details of the tire holder assembly with arcuate, bead-contacting plates, with an additional pair of dual jacks transverse to the original pairs of jacks, the chain drive system, and the turntable with drive;

FIG. 15, a longitudinal horizontal sectional view, taken on the line 15—15 of FIG. 14, showing the details of the turntable with drive;

FIG. 16, a fragmentary, lateral, vertical sectional view, taken on the line 16—16 of FIG. 15, showing the turntable wheels, axles, and mounting brackets;

FIG. 17, an enlarged, fragmentary, side elevational view corresponding to FIG. 14 and additionally showing the a portion of the rolling brushing unit;

FIG. 18, a lateral, vertical, sectional view, taken on the line 18—18 of FIG. 2, showing the details of the tire holder assembly including the dual jacks and the arbor;

FIG. 19, an enlarged perspective view showing the arbor stub shaft prior to attachment to the coupling stub shaft on the idler shaft;

FIG. 20, a perspective view corresponding to FIG. 19 showing the arbor stub shaft during attachment to the coupling stub shaft on the idler shaft;

FIG. 21, a perspective view, corresponding to FIG. 19, showing the arbor stub shaft after attachment to the idler shaft;

FIG. 22, an enlarged, partially broken perspective view of the tire holder assembly including the dual jacks and the arbor;

FIG. 23, a view of the tire holder assembly, with an intermediate portion broken out for convenience of illustration;

FIG. 24, an enlarged longitudinal vertical sectional view, taken on the line 24—24 of FIG. 23, showing the details of a jack;

FIG. 25, a lateral vertical sectional view, taken on the line 25—25 of FIG. 24, showing the details of a jack;

FIG. 26, a perspective view showing a second version of the preferred embodiment of the invention, which is mounted on a trailer of a tractor-trailer rig so as to allow the machine to be moved to the site of the tires;

FIG. 27, a perspective view of the trailer with the machine of such second version of the invention mounted thereon;

FIG. 28, an enlarged perspective view of a diesel-engine-powered, rolling brush unit of such second version of the invention, with the auger in the retracted position and the pulley drive cover removed;

FIG. 29, an enlarged perspective view corresponding to FIG. 28 of a diesel-engine-powered, rolling brush unit of such second version of the invention, with the auger in the extended position, and with the pulley drive cover removed;

FIG. 30, an enlarged, fragmentary, perspective view of the auger, with a portion of the casing broken away to show the feed screw;

FIG. 31, a perspective view of the fifth wheel tractor, with crane, for use with the second version of the invention as ready for receiving the trailer for towing;

FIG. 32, a perspective view showing such second version of the invention with a tire being loaded onto the machine mounted on the trailer, by means of the crane on the fifth wheel tractor.

DETAILED DESCRIPTION OF THE ILLUSTRATED EMBODIMENTS

Figure 1:
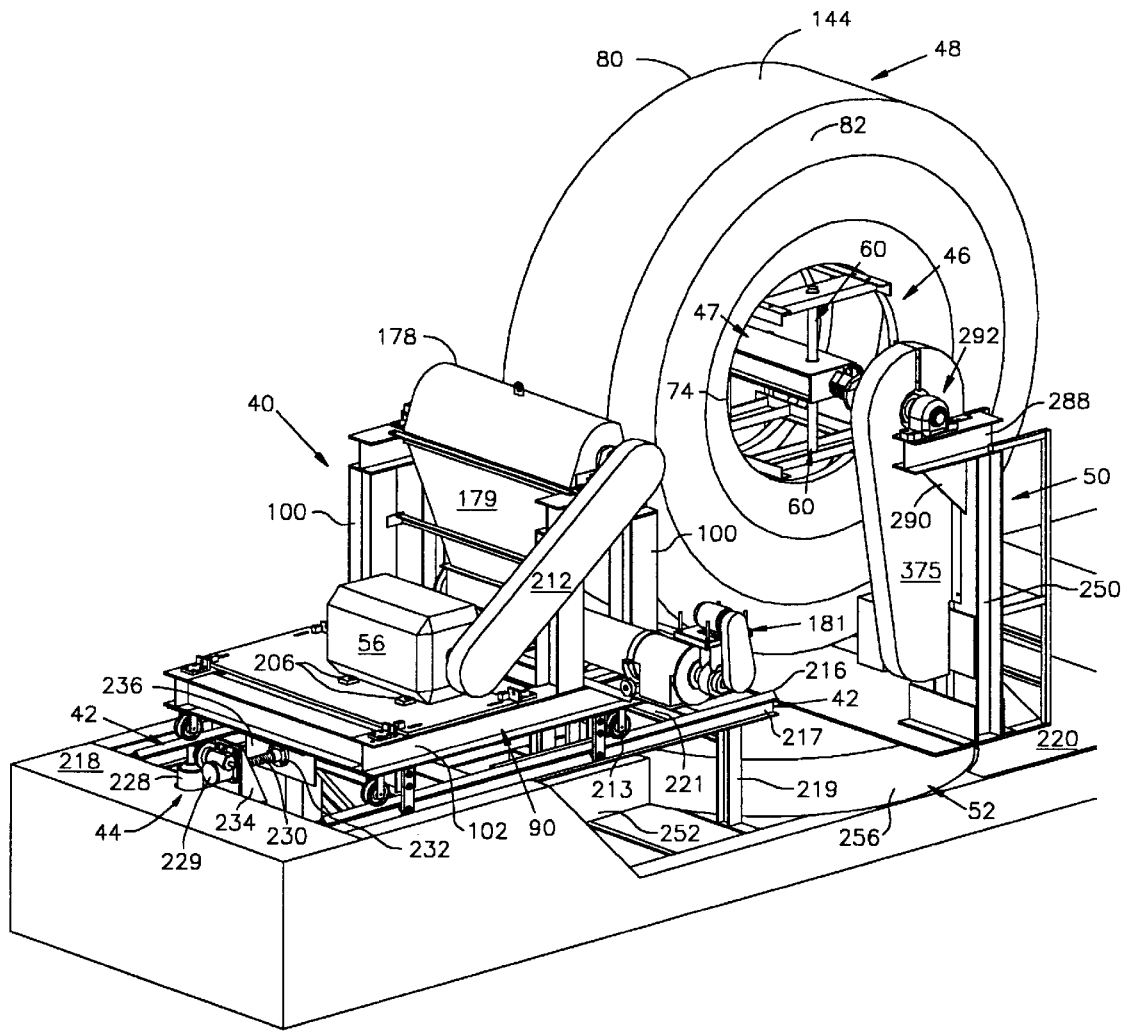
Figure 2:
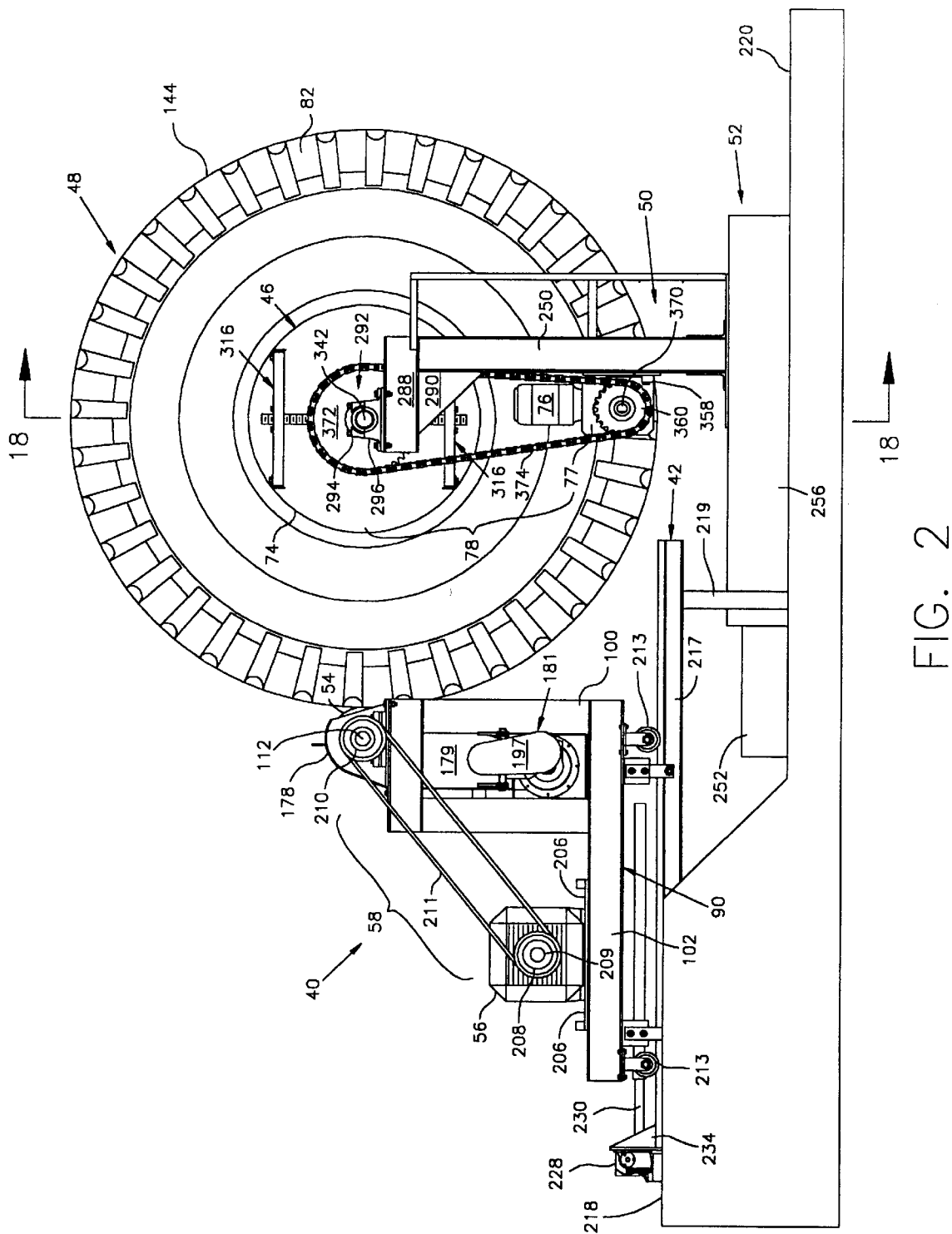

The first-shown version of the preferred embodiment of the invention, best shown in FIGS. 1, 2, 3, and 4, is constructed as a fixed machine for semi-permanent or permanent installation, such as at a tire recapping or retreading facility, or at a location where used off-road vehicle tires are located such as at an open-pit or strip mine. Such embodiment has a tire-operative means and mounting structure, comprising a linearly-rolling, motor driven, rolling brushing unit 40, which includes a pair of rails 42 upon which brushing unit 40 rolls in response to the urging of an electric screw drive 44; a tire holding means comprising a tire holder assembly 46 including an arbor 47, on which a tire 48 is removably mounted; and a supporting structure including a tire support frame 50 upon which arbor 47 is removably, rotatably mounted, and pivotable turntable 52 to which tire support frame 50 is mounted.

Figure 3:
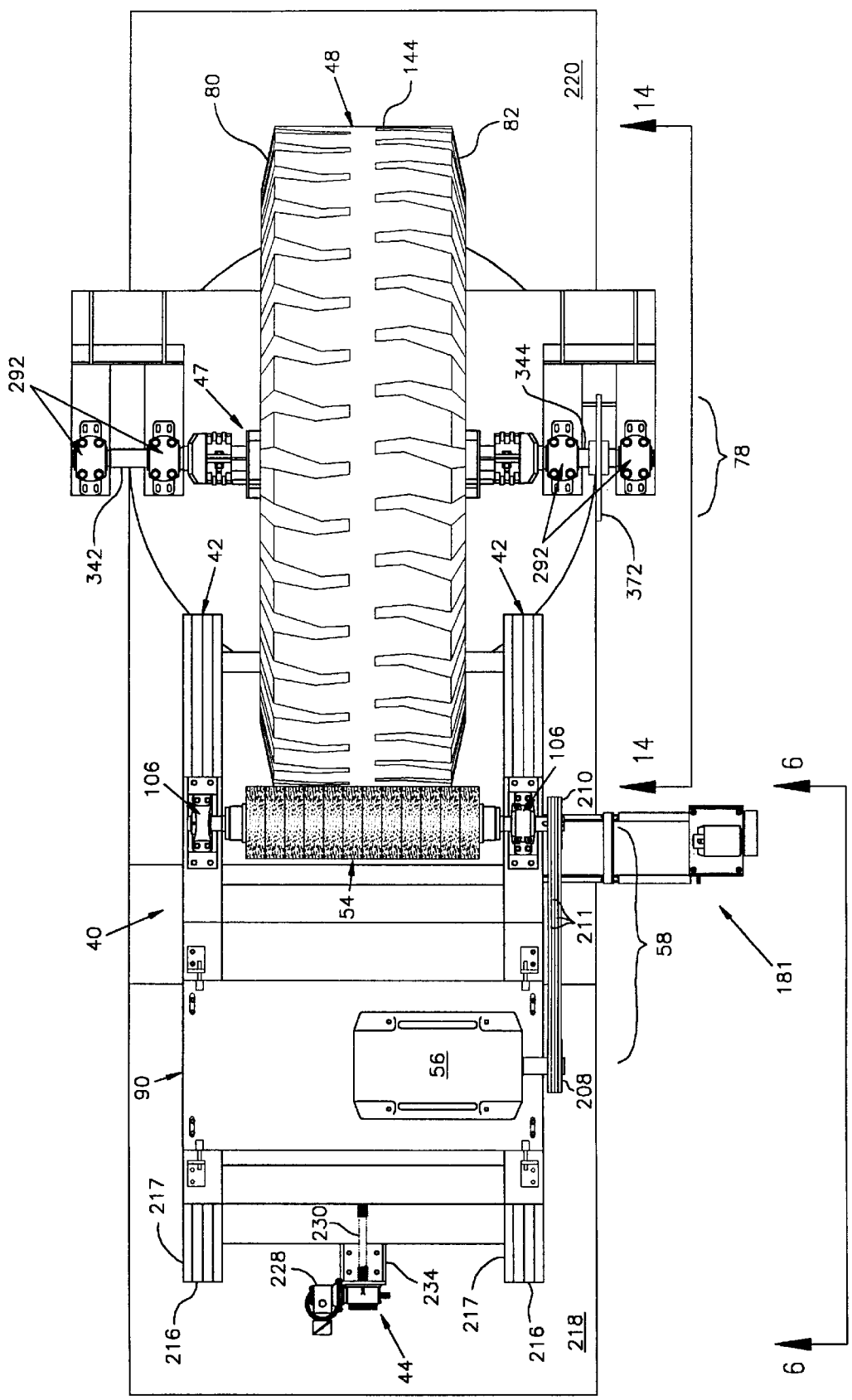
Figure 4:
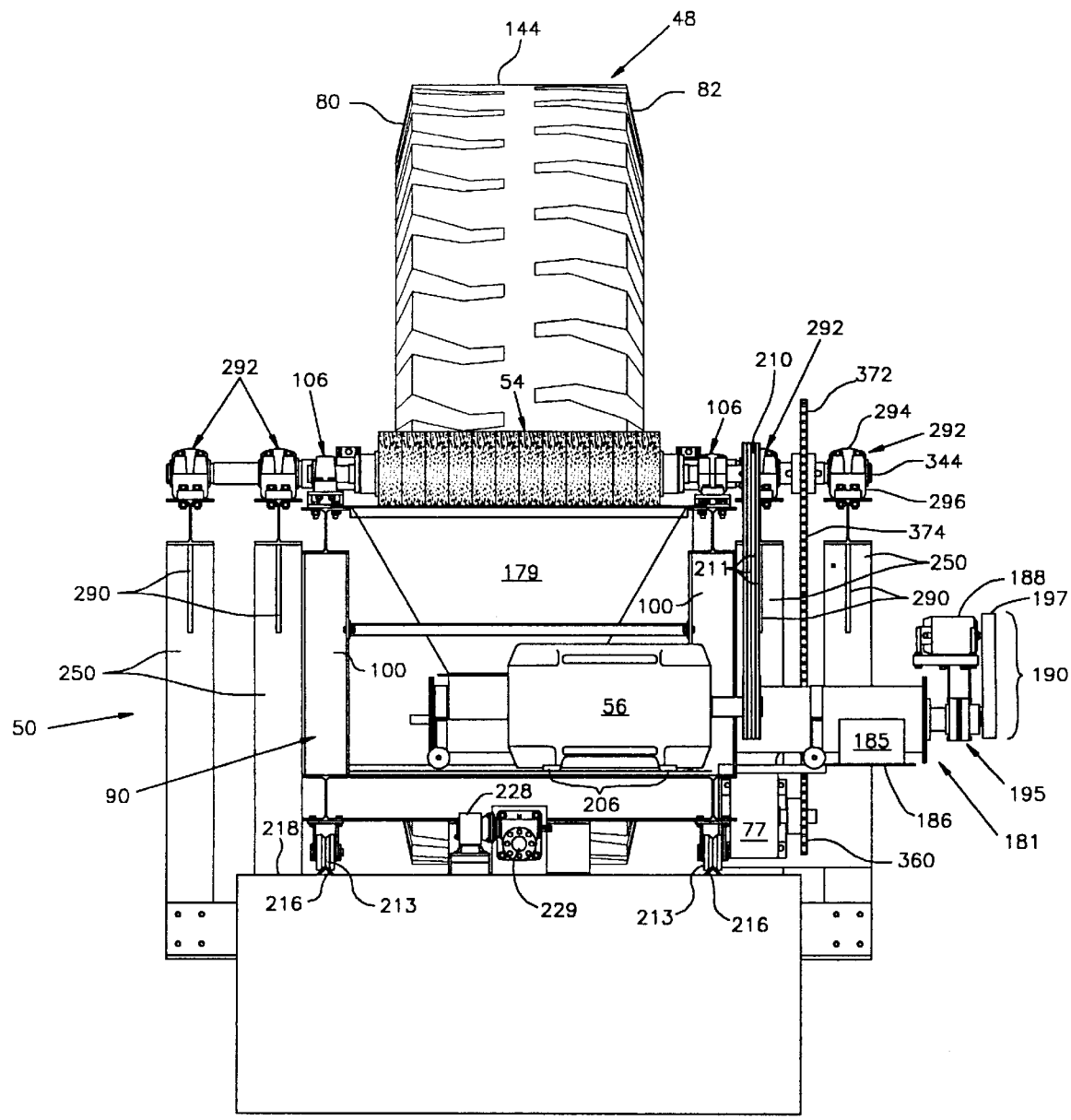
Figure 13:
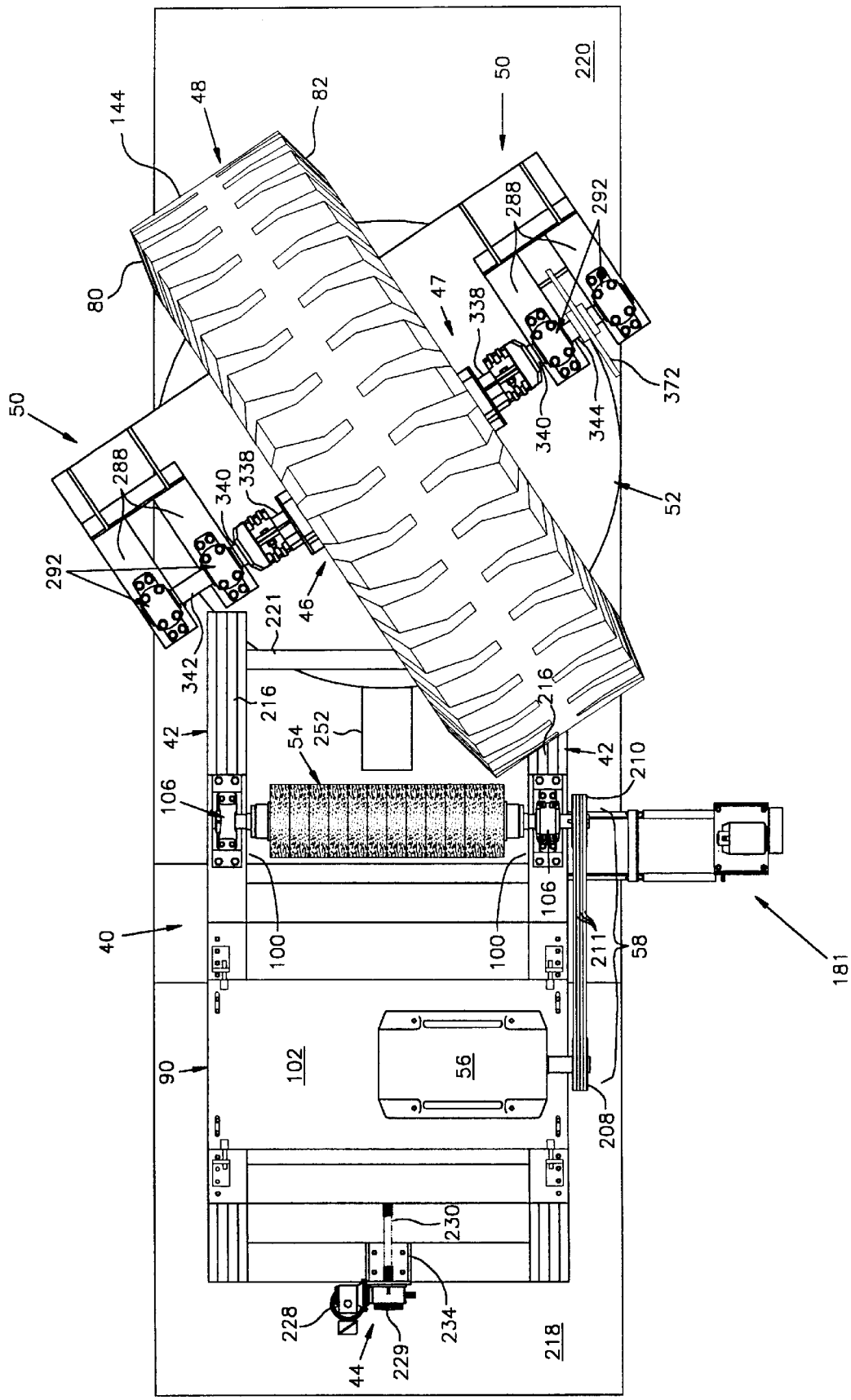

The tire-operative means includes an elongate, generally cylindrical, rotating, cutting brush 54, rotatably mounted on rolling brushing unit 40, which is powered by an electric motor 56, which can be a single rotational direction or a reversible rotational direction type motor, connected thereto through a brush pulley drive 58. Tire holder assembly 46 includes a pair of dual jacks 60 mounted at the respective middles thereof to arbor 47, which jacks 60 extend to grip beads 72 and 74 of tire 48, and retract to release tire 48. Tire holder assembly 46 with tire 48 is pivoted by an electric motor 76, which is a single rotational direction type motor, through a reduction gear drive 77, which is connected to arbor 47 through a tire chain drive 78. Turntable 52 is arranged to pivot such that the sidewalls 80 and 82 of tire 48 can be reached by brush 54 such that tread material can be removed therefrom (FIGS. 3 and 13). Turntable 52 is pivoted by means of a reversible rotational direction, electric motor 84 through a reduction gear drive 85, and through a small gear 86 that mates with a large gear 88 of turntable 52.

Figure 11:
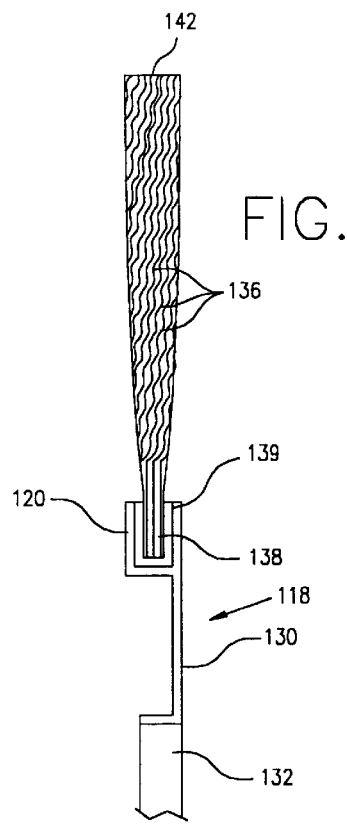
Figure 12:
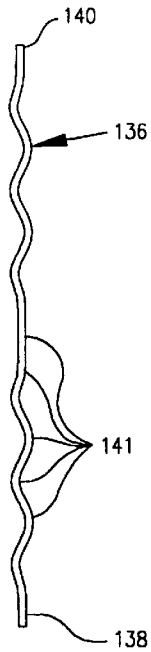
Figure 9:
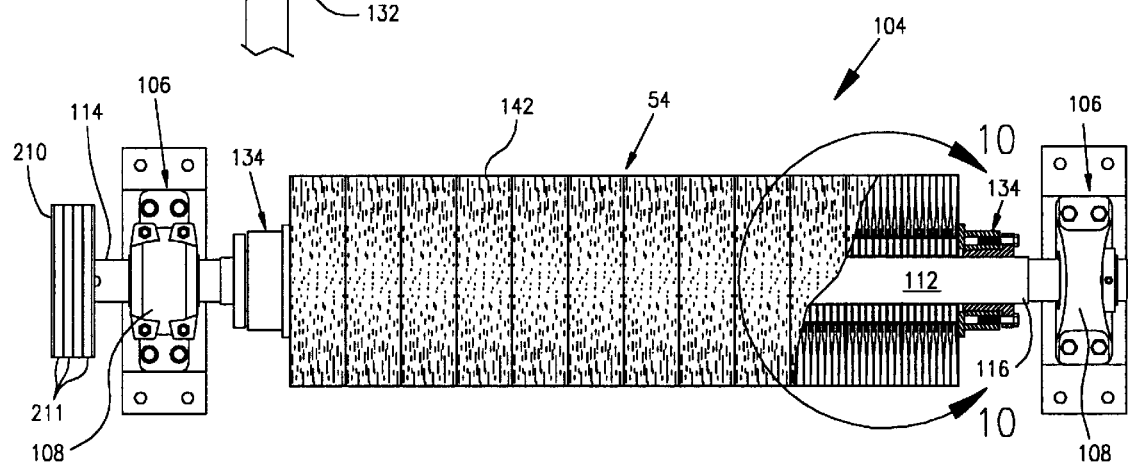
Figure 10:
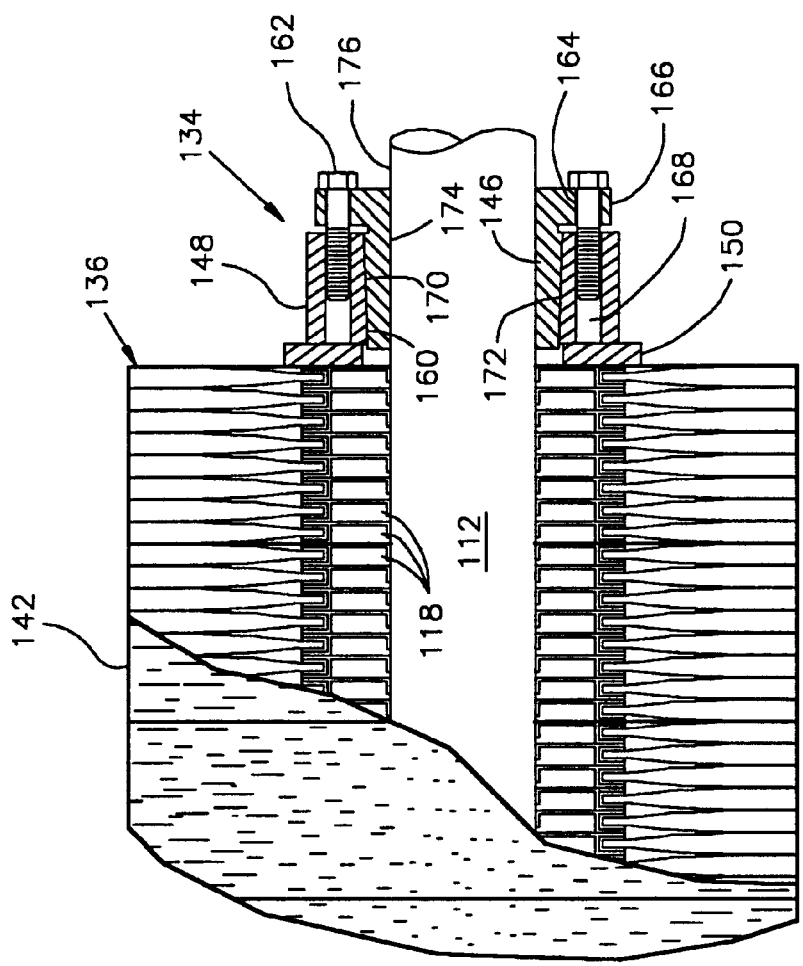

Rolling brushing unit 40 includes a substantially rigid frame 90 having a vertical portion 100 and a horizontal portion 102. Mounted to vertical portion 100 is a brush assembly 104 comprising rotating brush 54, and a pair of split bearings 106 having upper and lower portions 108 and 110, respectively (FIG. 9). Brush 54 has a shaft 112 extending the length thereof, the ends of which 114 and 116 extend through the respective split bearings 106. A hub means comprises a plurality of brush holder disks 118, each having an outer annular U-shaped flange 120 and an inner disk 130, with an aperture 132 extending therethrough, through which shaft 112 extends (FIGS. 10 and 11). Disks 118 are sandwiched between holding means comprising a pair of locking collars 134 which lock disks 132 to shaft 112. A plurality of twisted, crimped bristles 136, each have an inner end 138 disposed within an annular flange ring 139 within U-shaped flange 120, and affixed thereto by means such as crimping, welding, or brazing, radially extend from disk 118, and include an outer end 140 (FIGS. 11 and 12). The individual bristles 136 extending from brush holder disks 118 are crimped such as at 141, along their entire length or a portion thereof, and are twisted so as to be able to abut or engage adjacent bristles 136 on the same brush holder disk 118, and on adjacent disks 118. This abutting or engaging of bristles creates an outer brush surface 142 made up of bristle outer ends 140 that are spaced-apart relatively evenly, which creates a rougher outer brush surface 142 than uncrimped bristles, and which tends to remain so when forced against tire 48, resulting in a consistent, even cut on the outer, ground-contacting portion of the tread 144 and the respective sidewalls 80 and 82 of tire 48.

Holding means, comprising collars 134, maintain disks 118 in place and rotating with shaft 112, each comprise an inner collar 146, an outer collar 148, and a large ring 150 (FIG. 10). Brush holder disks 118 with bristles 136 are disposed on shaft 112 with one each of rings 150 and outer collars 148 adjacent the outer-most of disks 118 on shaft ends 114 and 116. One of inner collars 146 is disposed in an aperture 160 of each outer collar 148 with a plurality of bolts 162 extending through a plurality of apertures 164 of a flange 166 of inner collar 146 and threaded into a plurality of threaded apertures 168 in the respective outer collar 148. Locking is achieved by a tapered outer face 170 of inner collar 146 which mates with a corresponding tapered inner face 172 of apertures 160 of outer collars 148, such that an inner face 174 of inner collar 146 is forced against the exterior surface 176 of shaft 112 due to tapered outer face 170 of inner collar 146 being forced against tapered inner face 172 of outer collar 148.

Figure 5:
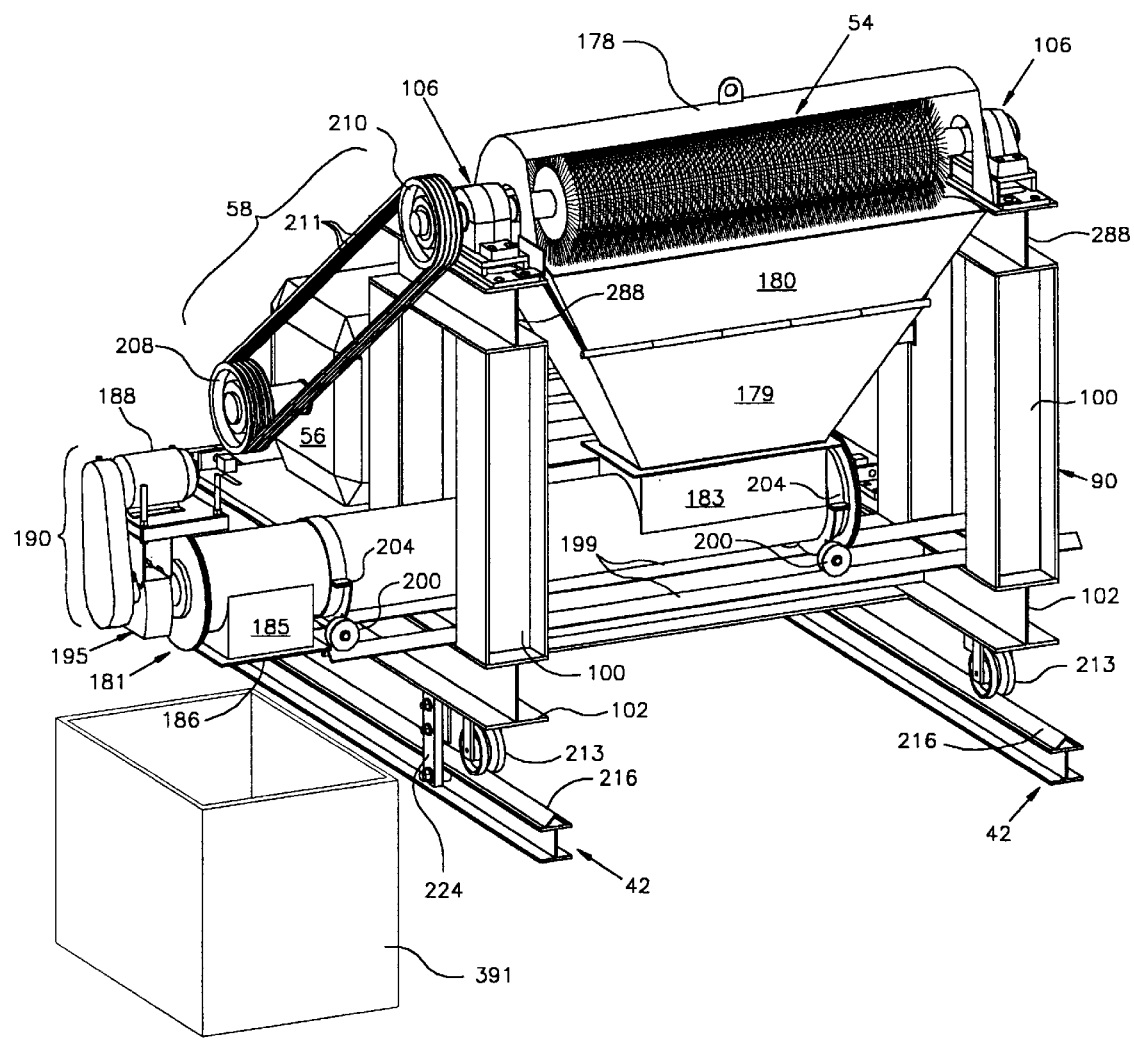

A brush shroud 178 extends around a portion of brush assembly 54, cooperating with a funnel-shaped collector 179 having a hinged, upwardly-extending, L-shaped door 180 (FIG. 5). Door 180 is hinged and positioned such that a the angled portion thereof rests against tire 48, with no gap therebetween, such that buffings removed from tread portion 144 of tire 48 are directed inwardly into collector 179 and therethrough, using gravity feed, directly into a recycling container (not shown), onto a conveyor belt (not shown), or preferably into an extendible and retractable screw auger 181 leading to a recycling container (not shown). Such container or conveyor belt can be located under collector 179 below rails 42. Door 180 of collector 179 also allows access to the interior of collector 179 such as to clean the interior or to remove obstructions therefrom.

Figure 30:
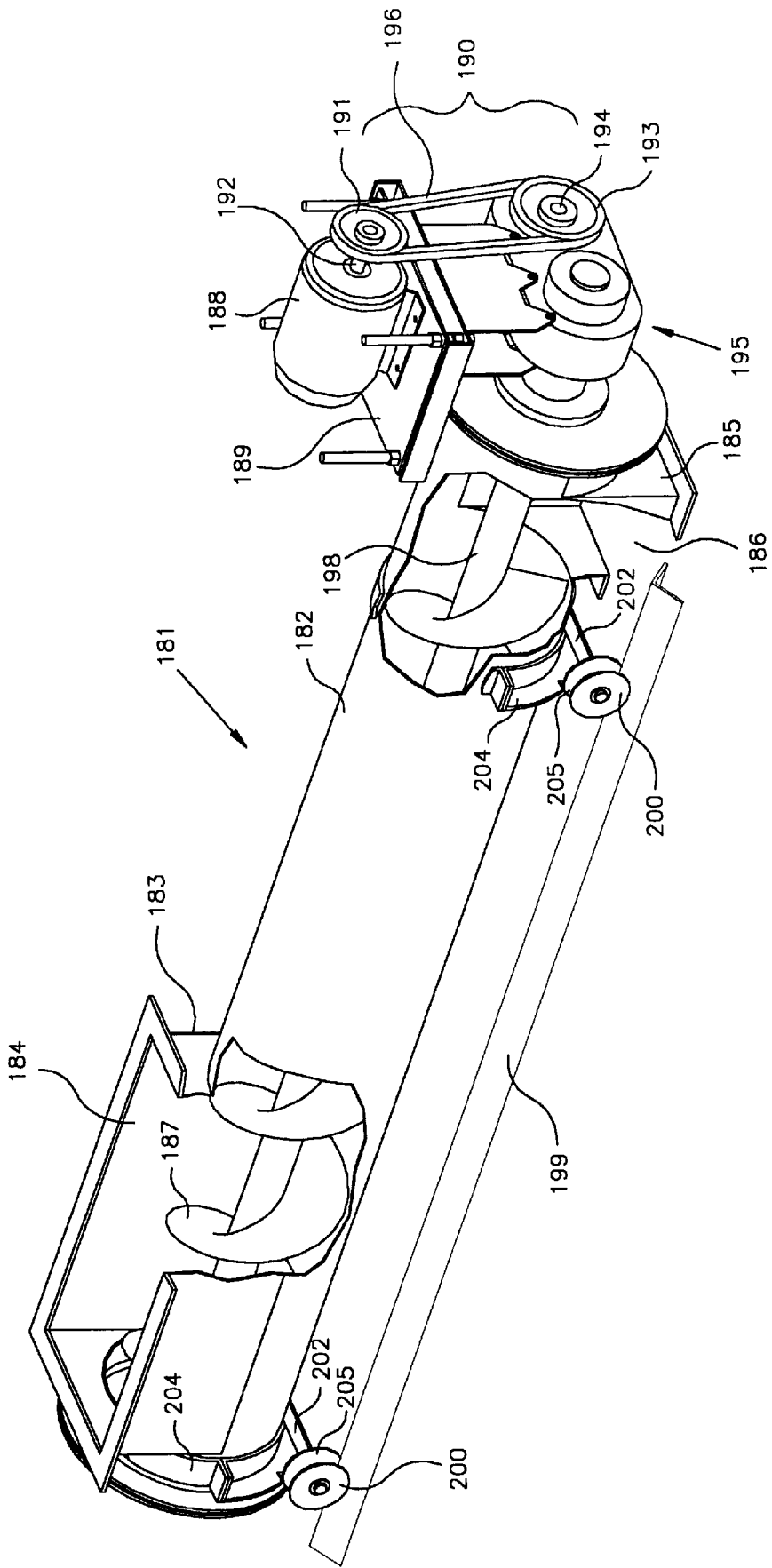

Screw auger 181 comprises a closed-ended main tube 182 which extends transversely on rolling brushing unit 40, having an inlet shroud 183 surrounding an inlet opening 184 at one end thereof, and an outlet shroud 185 surrounding an outlet opening 186 at the opposite end thereof (FIG. 30). Within main tube 182 is an elongate, rotatable, drive screw 187 which extends the length of main tube 182. A hydraulic or electric motor 188, which can be a single rotational direction or a reversible rotational direction type motor, is mounted to main tube 182 on a bracket 189. Power is transferred from motor 188 to drive screw 187 through a pulley drive 190 which comprises a motor pulley 191 connected to a motor shaft 192 of motor 188, a reduction gear drive pulley 193 attached to a shaft 194 of a reduction gear drive 195, and a belt 196 interconnecting pulleys 191 and 193. A cover 197 is positioned over pulley drive 190 for safety. Reduction gear drive 195 is connected to tube 182 and drives a shaft 198 of auger screw 187, which extends through main tube 182, with shaft 198 being journaled in bearings (not shown) at respective ends of main tube 182. A pair of parallel rails 199, each having an angular cross-section, are affixed below auger 181 to horizontal frame 102. A pair of wheels 200, at each end of auger tube 182, roll on an axle 202, affixed to respective ends of auger tube 182 by means of a respective bracket 204. Wheels 200 have peripheral V-grooves 205 that match the angular cross-section of rails 199 to allow screw auger 181 to roll thereon and to help prevent derailment thereof.

Figure 7:
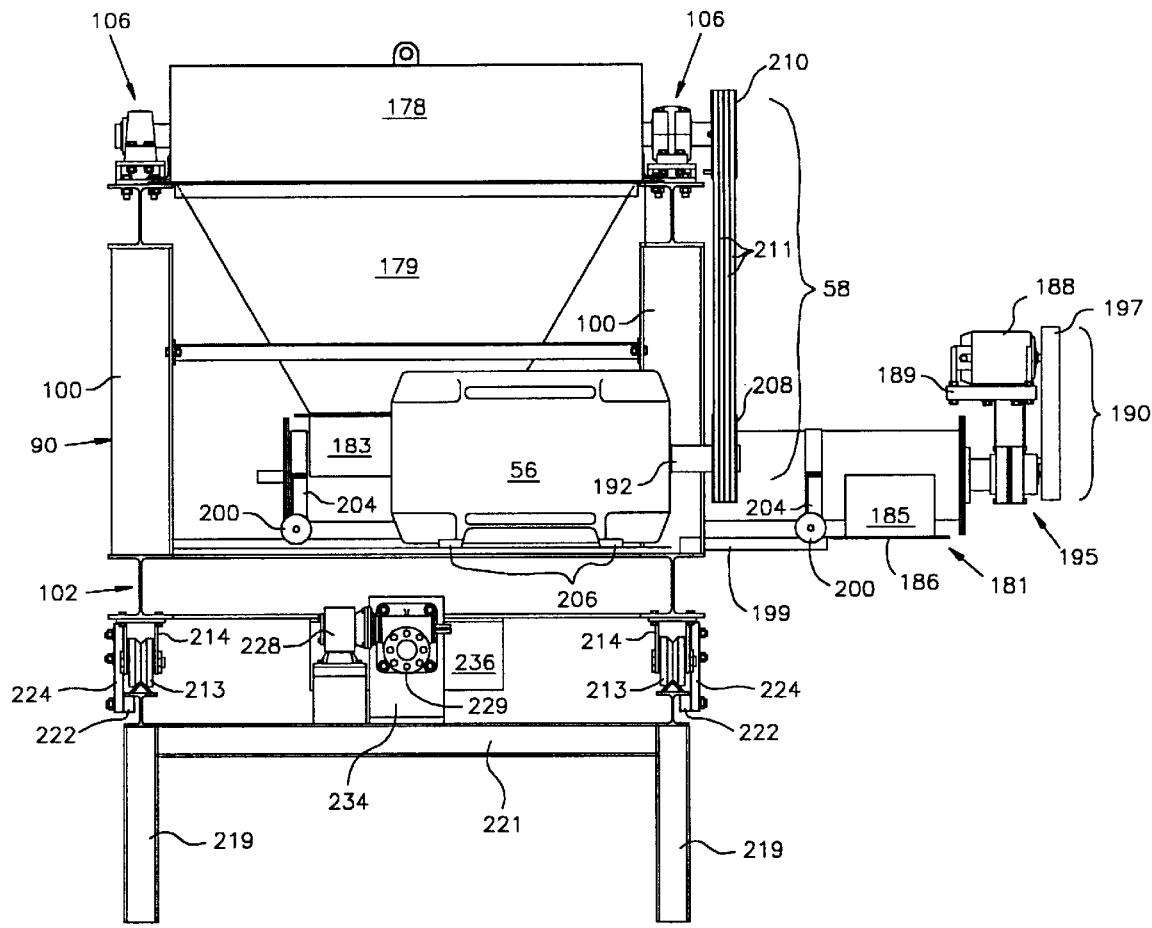
Figure 8:
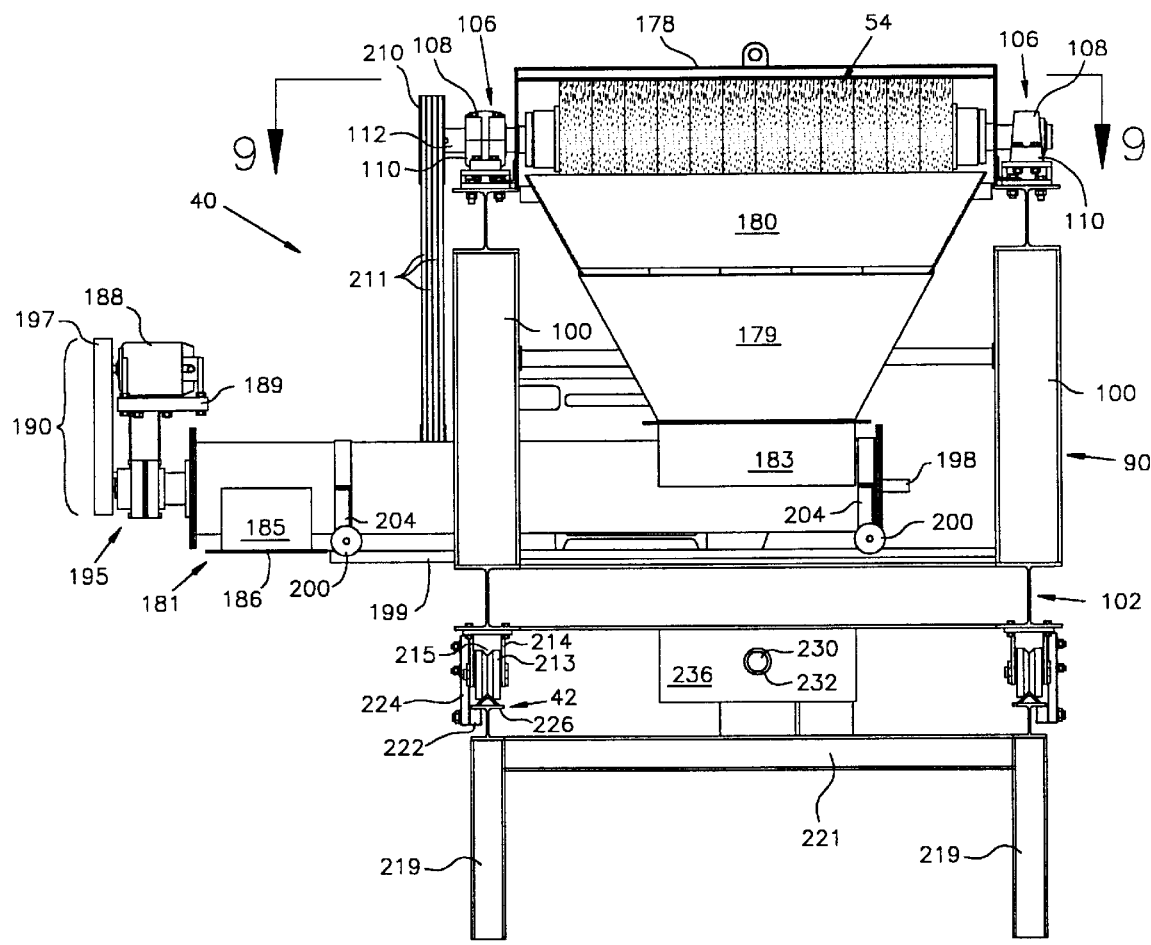

Screw auger 181 has two positions on rails 199. In a first, or operative position, screw auger 181 is positioned with one pair of wheels 200 against a rail stop (not shown) at the end of rails 199, wherein inlet opening 184 is positioned directly below collector 179, such that the buffings removed from tire 48 can enter main tube 182 for drive screw 187 to feed therethrough (FIGS. 5, 7, and 8). In such an operative position, outlet 186 overhangs the side of rolling brushing unit 40, such that a suitable container or conveyor belt (not shown) can be positioned under outlet 186 to catch the buffings for recycling. In a second, or retracted position, screw auger 181 is positioned such that a pair of wheels 200 contact another rail stop (not shown) at the opposite end of rails 199, wherein screw auger 181 does not overhang the side of the rolling brushing unit 40. This retracted position is advantageous for transport of the machine, such as for initial installation at a site or for a subsequent move to a new installation site. A fixed-position screw auger (not shown) similar to screw auger 181 may also be used wherein rails 199, wheels 200, axles 202, and axle mounting brackets 204 replaced by mounting brackets (not shown) affixing such screw auger to horizontal portion 102 in an operative position.

Figure 6:
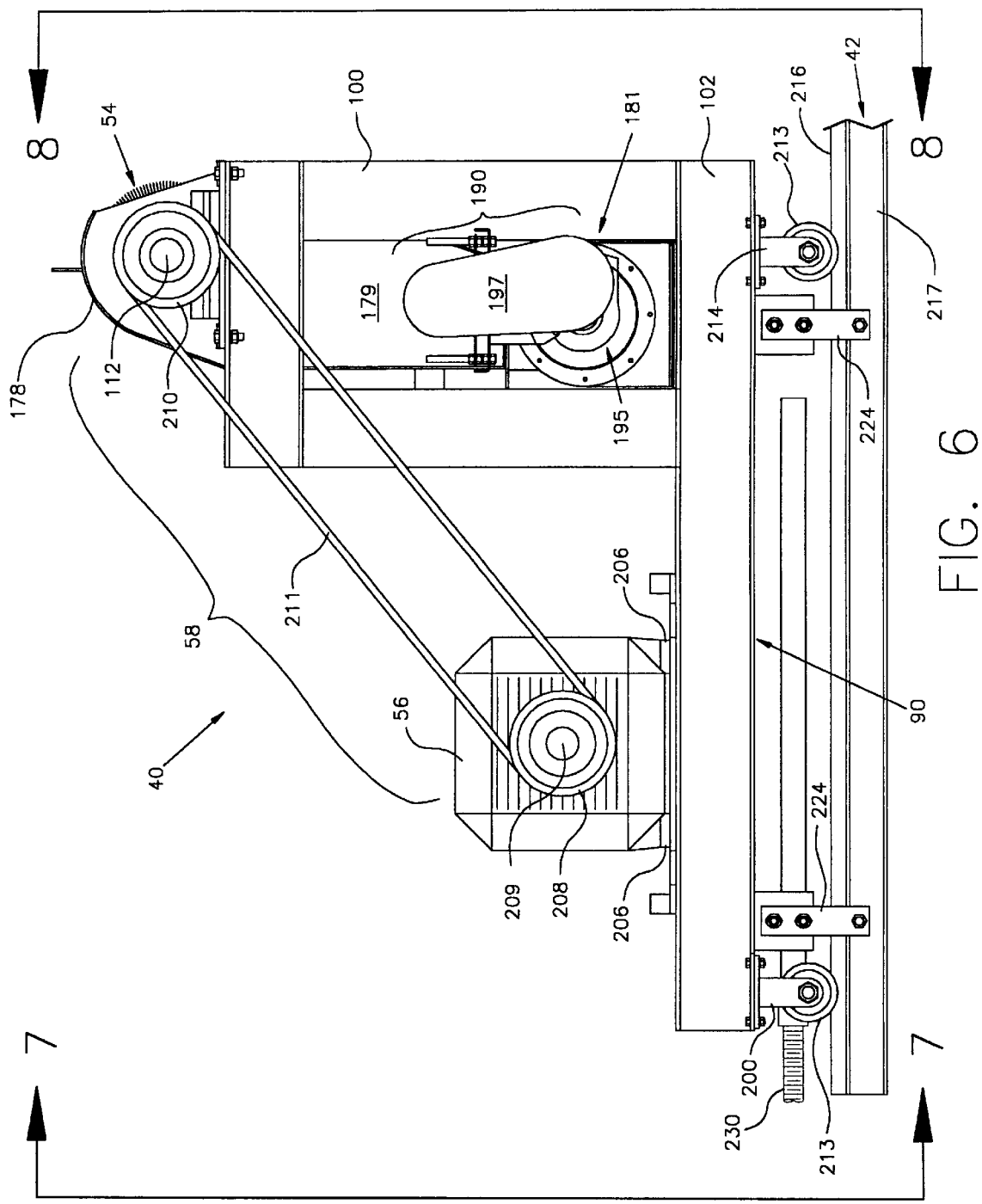

Cutting brush 54 is powered by means of a hydraulic, or preferably an electric motor 56, which is a single rotational direction type motor, that is mounted to frame horizontal portion 102 by using mounting brackets 206 (FIGS. 5 and 6). Rotary power is transferred from motor 56 to cutting brush 54 by means of brush pulley drive 58, which comprises a multiple belt pulley 208 connected to a power output shaft 209 of motor 56, a multiple belt pulley 210 connected to brush shaft end 114, and a plurality of belts 211. A cover 212 is positioned over brush pulley drive 58 for safety.

Rolling brushing unit 40 is movable on a plurality of rollers or wheels 213, which are mounted to the underside of frame horizontal portion 102 using brackets 214 (FIGS. 5, 6, 7, and 8). Each of wheels 213 has an outer peripheral V-groove 215 that mates with an upper angled cross-section portion 216 affixed to a respective I-beam 217 of each rail 42, which I-beam is bolted to a structural base upper level 218. A leg 219 of each rail 42 is attached to and supports I-beams 217 above a structural base lower level 220 with a shared tie bar 221 of rails 42, which connects legs 219 together. A plurality of lower rollers, or wheels 222 are mounted on brackets 224 extending from the underside of frame horizontal portion 102. Lower wheels 222 fit under an upper flange 226 of each I-beam 217 to prevent the respective wheel 213 from disengaging from the respective rail 42.

Rolling brushing unit 40 includes electric screw drive 44 which moves rolling brushing unit forward and backward, which screw drive 44 includes a reversible rotational direction, hydraulic motor, or preferably, a reversible rotational direction electric motor 228 operating through a reduction gear drive 229 which rotates a drive screw 230 thereof (FIGS. 1, 2, 3, and 4). Motor 228 and gear drive 229 are affixed to structural base upper level 218 by means of a bracket 234 bolted thereto. A drive nut 232 is connected to and extends through a plate 236 extending downwardly from frame horizontal portion 102. Drive screw 230 threadably engages drive nut 232 such that when motor 228 causes drive screw 230 to rotate, rolling brushing unit 40 moves forward or backward on rails 42 depending on which rotational direction motor 228 is turning. Rolling brushing unit 40 is normally slowly moved toward tire 48 during operation of the machine, with the rate of movement thereof controlling the pressure which bristles 136 of brush 54 exerts on tire 48. The faster the feed rate, the larger and coarser the buffings produced and vice versa.

Figure 14:
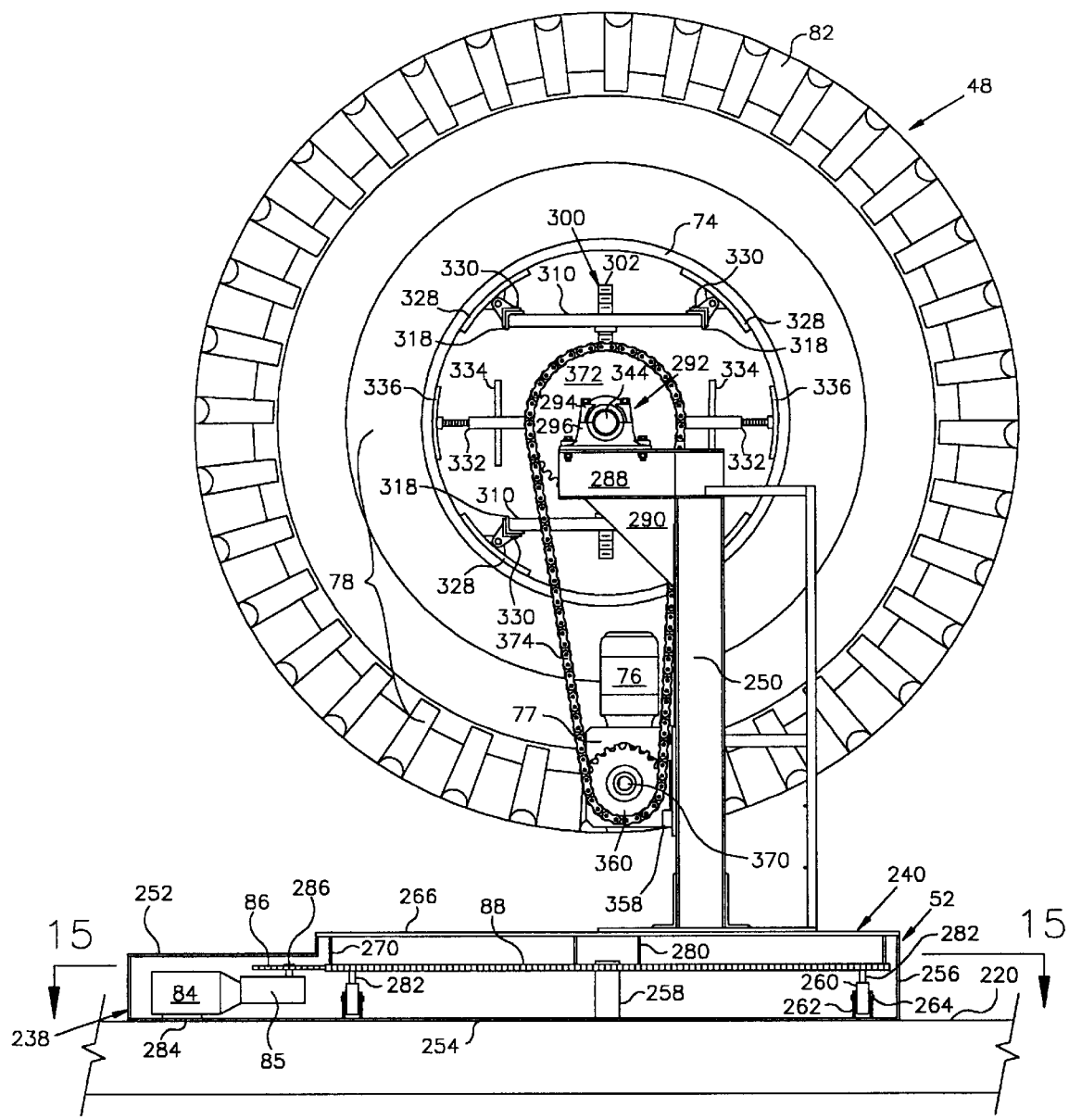
Figure 15:
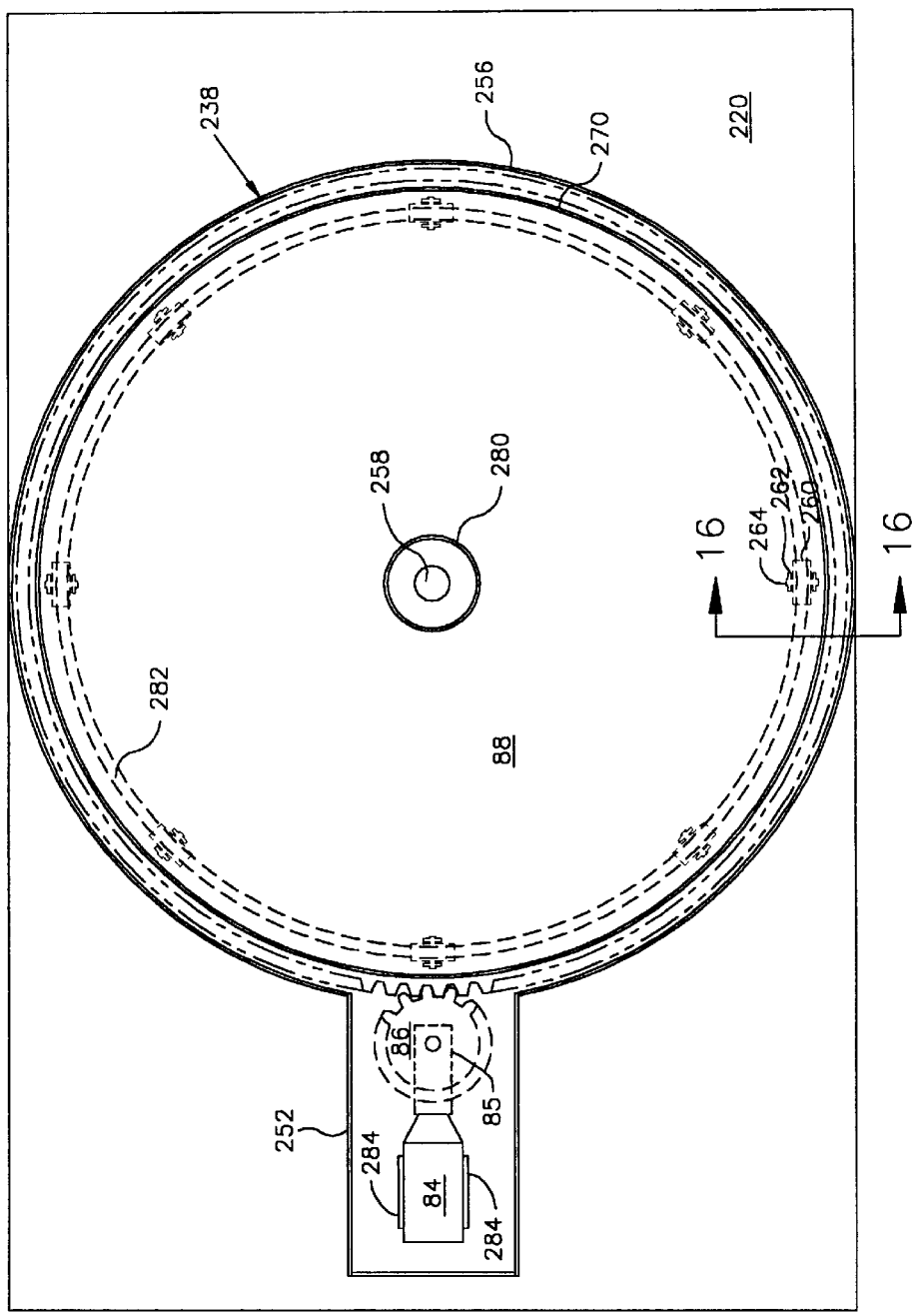
Figure 16:
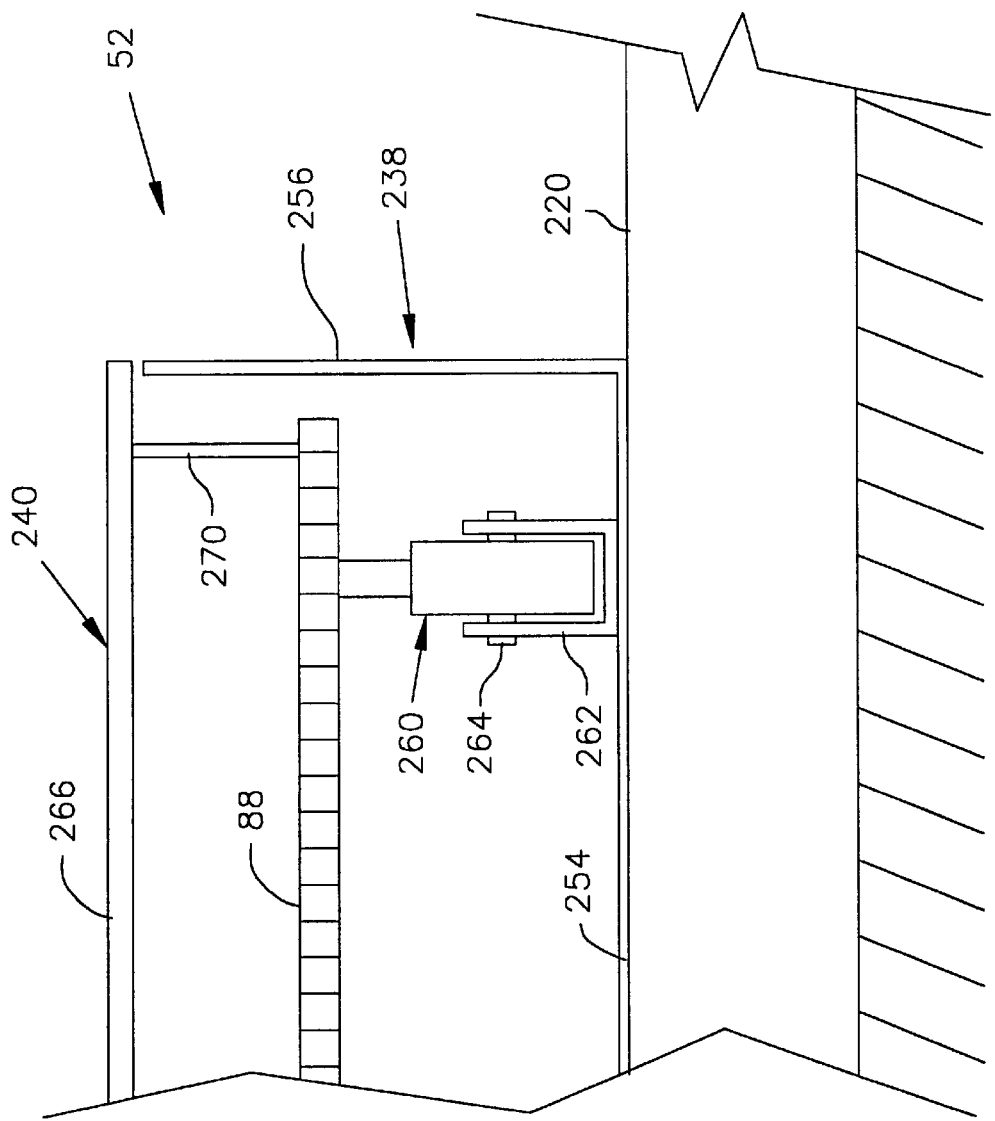

Turntable 52 can be pivoted such that tire holding assembly 46 rotates tire 48 laterally relative to brush 54 (FIGS. 3 and 13). This allows brush 54 to reach sidewalls 80 and 82 of tire 48 so as to remove tread material therefrom. Turntable 52 comprises a fixed lower base 238, and a rotating upper base 240, to which frame 50 is affixed, which includes two pairs of L-shaped, upwardly-extending frames 250 (FIGS. 14 and 15). Lower base 238 is generally circular as viewed from above, having motor housing 252 extending from the outer periphery thereof, a bottom plate 254, and an upstanding perimeter wall 256. Centered within lower base 238 is a bearing post 258, which is affixed to bottom plate 254, with a thrust bearing (not shown) therein to aid in supporting upper base 240. Surrounding bearing post 258, at an equal radial distance therefrom and at an equal angular spacing are a plurality of upstanding rollers, or wheels 260, each of which is rotationally mounted to bottom plate 254 by means of a bracket 262 and axle 264 (FIG. 16). Riding atop bearing post 258, on wheels 260 is upper base 240, which comprises a generally circular upper plate 266, affixed in a spaced relationship to large gear 88 by means of a large circular outer wall 270 and a small circular inner wall 280 affixed to upper plate 266 and to gear 88. A circular track 282 is affixed to the bottom of large gear 88 at such a radial distance from bearing post 258 that wheels 260 contact track 282 and ride thereon. Large gear 88 is driven by means of reversible rotational direction, hydraulic motor, or by, preferably, a reversible rotational direction electric motor 84, which is attached to lower plate 254 by means of brackets 284. Small gear 86 is connected to a power output shaft 286 of reduction gear drive 85, the teeth small gear 86 of which engaging the teeth of large gear 88. The gearing of reduction gear drive 85, along with the number of teeth of respective small gear 86 and large gear 88, is such that turntable 52 pivots at from about two to five RPM, which slow speed allows precise positioning of tire 48 relative to brush 54. Each of upstanding frames 250 have an upper cross member 288 with a reinforcing gusset 290. Atop each of cross members 288 is mounted a split bearing 292 each having upper and lower housings 294 and 296, respectively.

Figure 22:
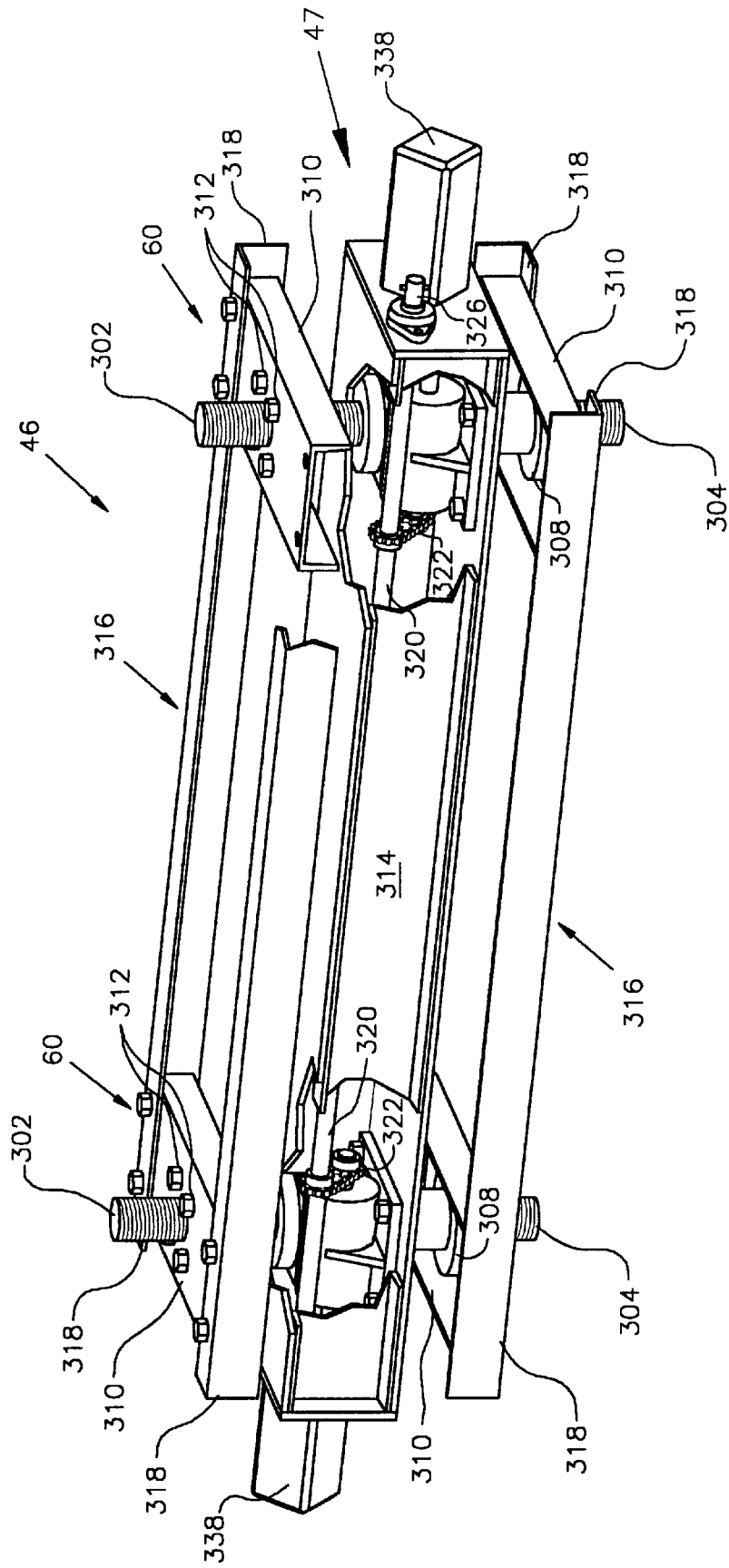
Figure 23:
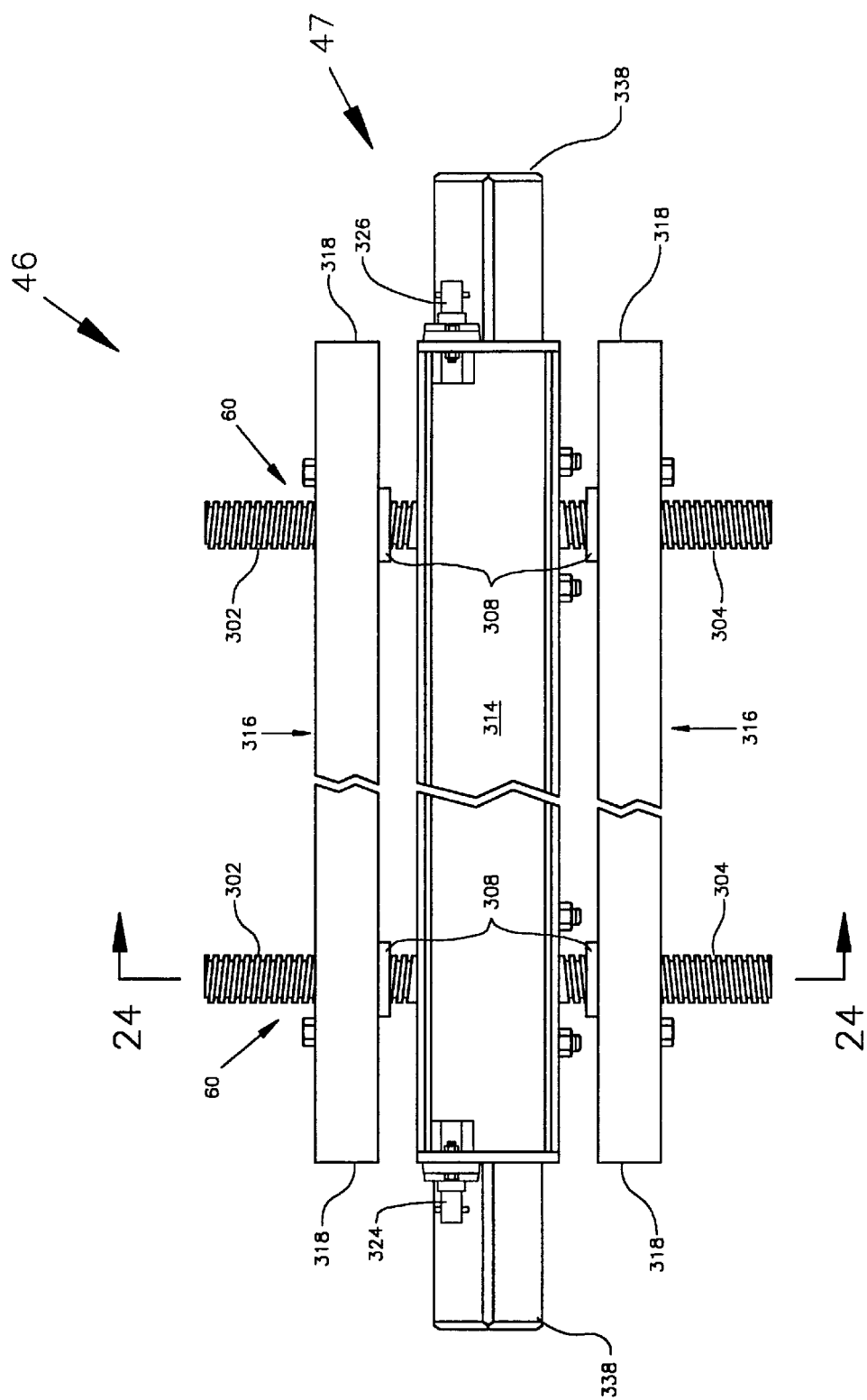
Figure 25:
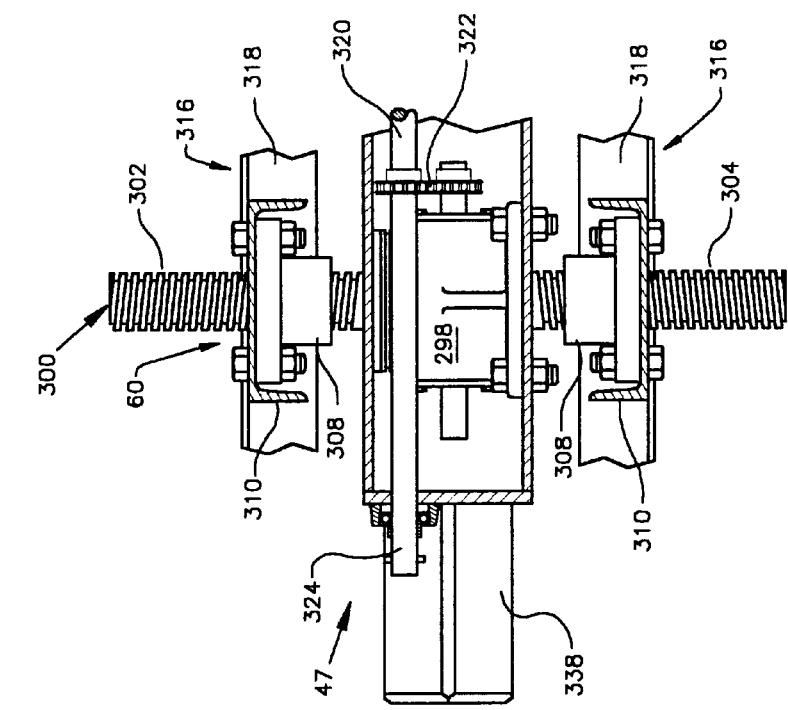
Figure 24:
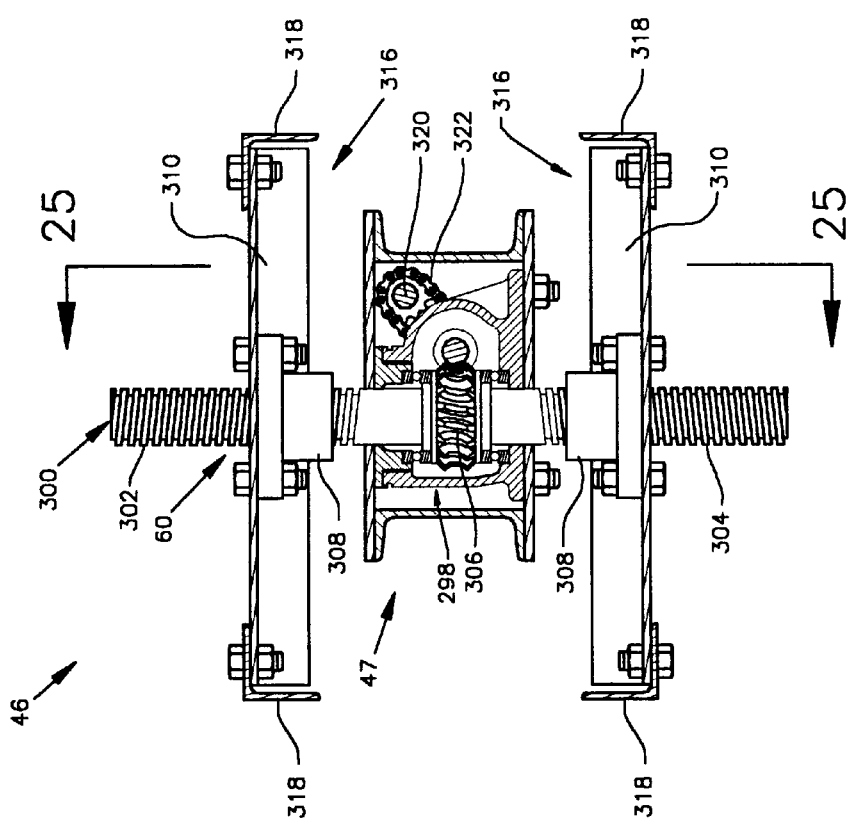

Tire holder assembly 46 comprises dual tire holding jacks 60, each having corresponding jack-operating mechanisms 298, and each having a single jack shaft 300, with end portions 302 and 304 thereof threaded in opposite rotational directions (FIGS. 18, 22, and 23). Each of jack-operating mechanisms 298 has a gear 306 affixed to a respective jack shaft 300, for rotation thereof. Each of jack shaft end portions 302 and 304 have threaded thereon a threaded hub 308 which is connected to a respective end piece 310 by means of a plurality of bolts 312 of a corresponding elongate, substantially rigid, clamping frame 316, which has a pair of longitudinal side pieces 318 for spanning the distance along the inside width of a received tire 48, between tire beads 72 and 74. Jacks 60 are rigidly held in longitudinally spaced apart relationship by the mechanisms 298 which are disposed within an elongate housing 314 of arbor 47. Housing 314 extends axially through the tire 48 and protectively houses such jack-operating mechanisms 298 of the respective dual jacks 60. Frames 316 also extend through the tire so that longitudinal side pieces 318 contact the corresponding beads 72 and 74 of the tire 48 at the ends of the respective chords spanned by such frame ends of the tire holder assembly 46. Jack-operating mechanisms 298 are operatively interconnected by a shaft 320 and by respective sprocket assemblies 322. Opposite ends 324 and 326 of shaft 320 project exteriorly of arbor housing 314 for receiving a hand crank (not shown) at such times as the dual jacks 60 are to be either extended or retracted relative to the corresponding beads 72 and 74 of a tire 48. When jack shafts 60 are rotated in one rotational direction by jack-operating mechanism 298, the pairs of jacks 60 will extend so as to clamp longitudinal side pieces 318 against tire beads 72 and 74 and when rotated oppositely such jacks 60 retract so as to release longitudinal side pieces 318 from engagement with tire beads 72 and 74.

Figure 17:
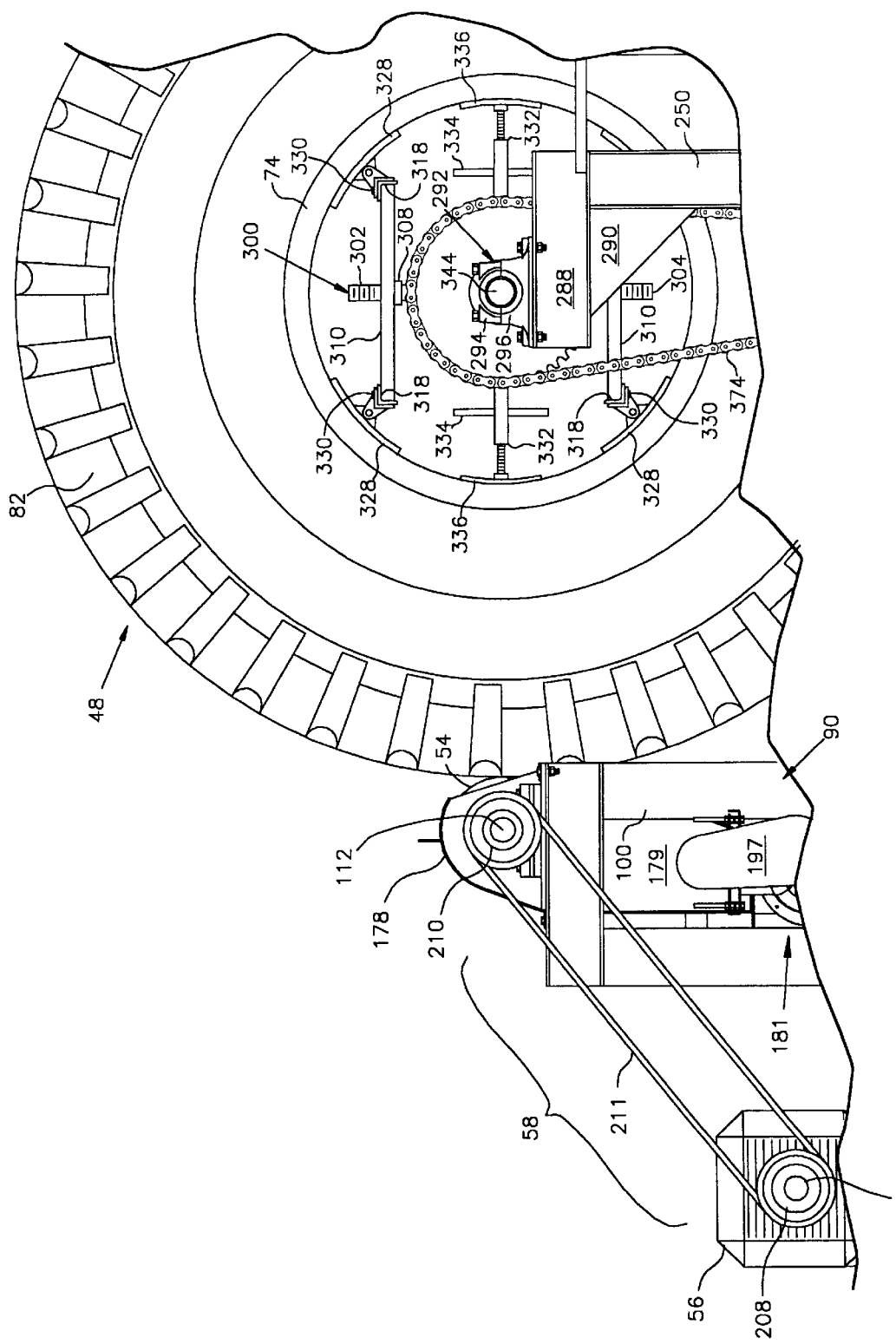

When tire 48 is to be retreaded and remounted on the usual receiving rim of a vehicle wheel (not shown), care is taken to preserve the integrity and true circular formation of the mounting beads 72 and 74 of the tire during removal of tire tread material. For this purpose, frames 316 can have properly curved, bead contacting attachments 328 attached thereto by means of bolts 330, which attachments 328 contact tire 48 rather than side pieces 318 of frames 316 (FIGS. 14 and 17). Likewise, it is advantageous to provide an additional pair of auxiliary, or dual jacks 332 for positioning diametrically across the interior of tire 48 by the tire holder assembly 60 of the apparatus, the same extending normal to and across the corresponding jacks 60 and usually being manually operable, as by means of handle mechanisms 334, so that properly curved, bead-contacting end plates 336 can be extended and retracted into and out of contact with tire 48 at will so as to further maintain tire beads 72 and 74 in a circular configuration.

Tire holder assembly 46 with arbor 47 is preferably constructed for quick and easy replacement by other tire holder assemblies sized to handle various desired tire sizes. For this purpose, the opposite ends of arbor housing 314 have affixed thereto respective stub shafts 338, having a rectangular cross-section. Stub shafts 338 connect to a pair of coupling stub shafts 340, connected to respective coaxial idler and motorized shafts 342 and 344, which are spaced apart having a gap therebetween for receiving arbor 47 (FIGS. 19, 20, and 21). Each of coupling stub shafts 340 have a shaft portion 346 connected to the respective idler and motorized shaft 342 and 344 and an angled deflector plate 348, which aids in longitudinally centering arbor 47 with stub shafts 338, and having an angled support plate 350 extending therefrom. A pair of locking plates 352 are hingedly connected to each of plates 350 by means of a pair of pins 354 and locked in a closed position by means of a bolt 356 and nut 358.

Idler shaft 342 and motorized shaft 344 are journaled in bearings 292 atop respective frames 250 and are driven by a hydraulic motor, or by, preferably, an electric motor 76, of the single rotational direction type, which is connected to one of frames 250 using a motor bracket 359 (FIGS. 3 and 14). Rotary power is transferred from motor 76 to motorized shaft 344 by tire pulley drive 78, which comprises a motor sprocket 360 affixed to a power output shaft 370 of motor 76, a sprocket 372 affixed to motorized shaft 344, and a tire drive chain 374. A cover 375 fits over tire pulley drive 78 for safety. Tire holder assembly 46 with arbor 47 and tire 48 mounted thereon are typically operated at between about twelve to eighteen RPM.

Although the above form of apparatus provided with stub shafts 338 of arbor 47 for quick and easy connection to corresponding coupling stub shafts 340 of idler and motorized shafts 342 and 344 is preferred, stub shafts 338 protruding from opposite ends of arbor 47 can be elongated to themselves take the place of idler and motorized shafts 342 and 344 or arbor housing 314 can be a motor driven shaft throughout with jack-operating mechanisms 298 suitably interposed intermediate its length.

Tire holder assembly 46 with a tire 48 mounted thereon is rotated differentially as to speed relative to rotating cutting brush 54, the speed differential being typically twelve to eighteen RPM for the former and eleven hundred to twelve hundred RPM for the latter. The relative direction of rotation of the brush 54 and the tire 48 which is such that the outer tread portion 144 of tire 48 moves upwardly and brush outer surface 142 moves downwardly at the contact area therebetween. This rotational direction of tire 48 permits collector door 180, which is hinged at a lower portion thereof and extends upwardly, to ride against outer tread portion 144 without binding at area of interface therebetween. This rotational direction also directs buffings downwardly into collector 179.

The control of the various motors which pivot turntable 52, rotate tire holder assembly 46, rotate screw auger 181, rotate brush 54, and move rolling brushing unit 40 is done using conventional electrical means, through a control panel (not shown) which can be mounted in any convenient location on trailer 378. Such controls may include on/off switches, forward/reverse motor rotational direction switches, and variable speed rheostat-type devices to control the speeds of operation of the various motors.

Figure 26:
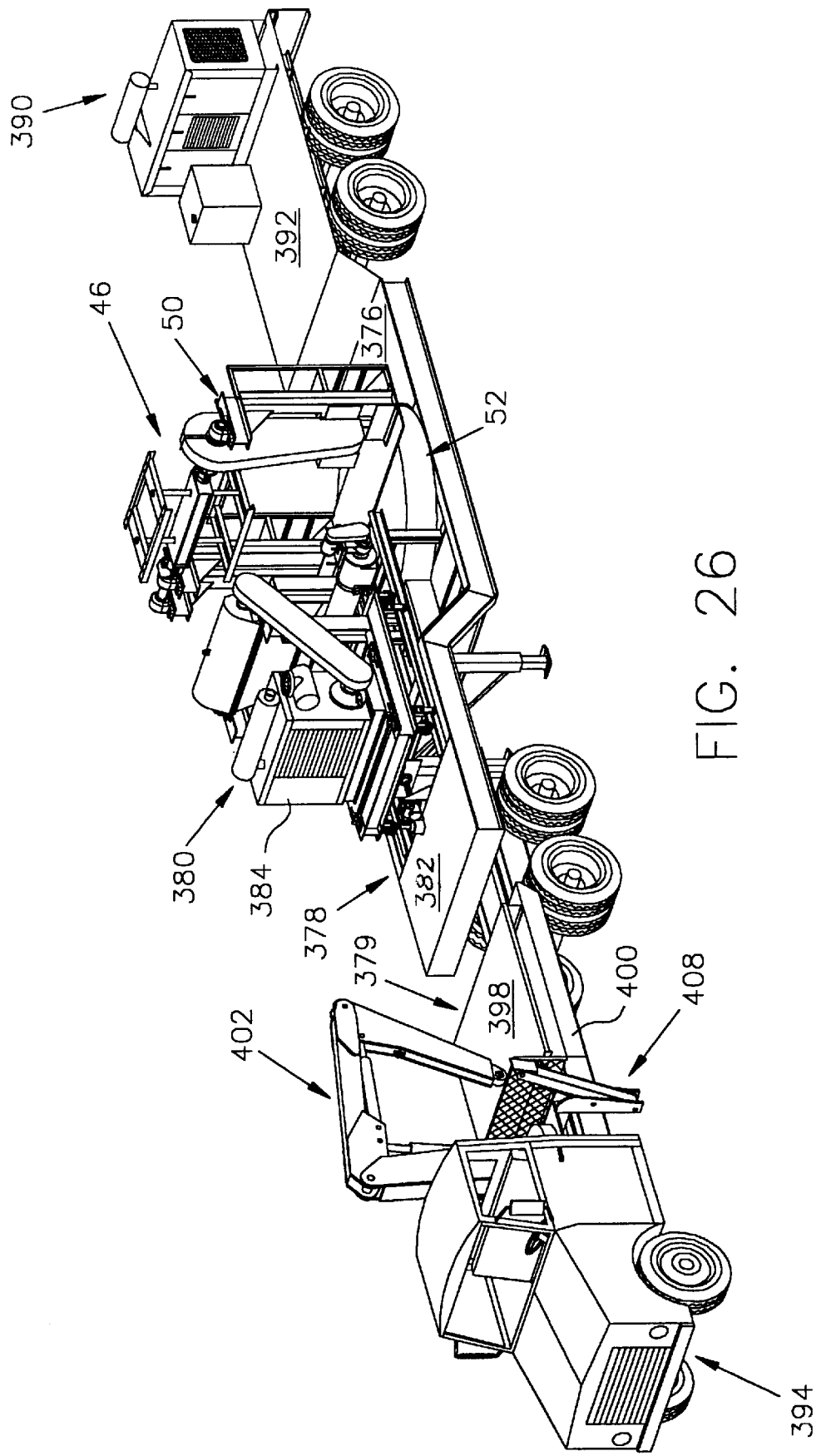
Figure 27:
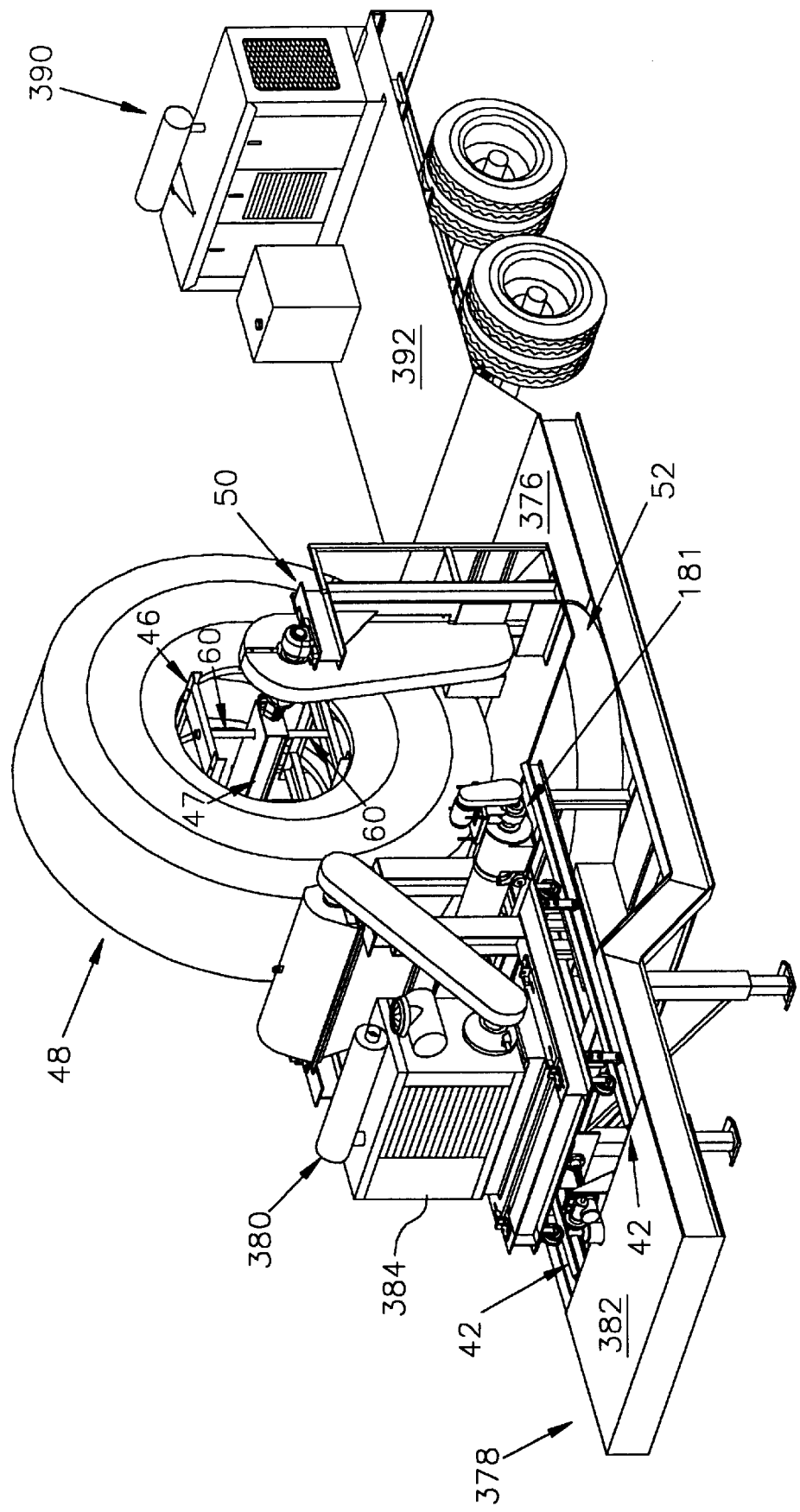

A second-shown version of the preferred embodiment of the invention is adapted for mobile usage, rather than for use at a fixed location, thus enabling a single machine to serve multiple tire locations (FIG. 26). Such version uses the same tire holder means and supporting structure as the first-shown embodiment, including tire holder assembly 46, tire support frame 50, and turntable 52. Turntable 52, however, is mounted to a lower bed, or structural base lower level 376, of a bi-level flatbed trailer 378, rather than to concrete structural base lower level 220 of such first-shown version (FIG. 27).

Figure 28:
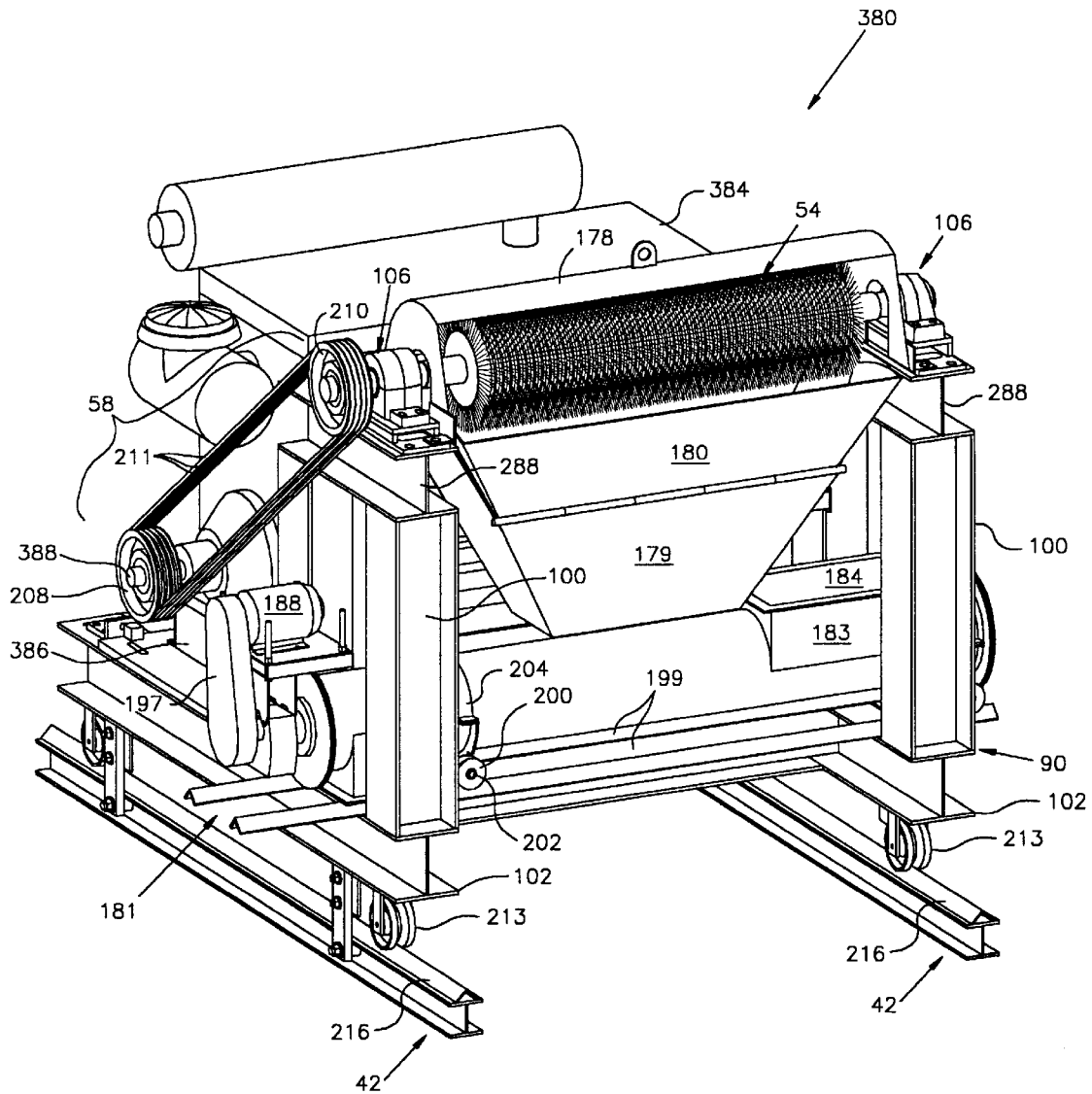
Figure 29:
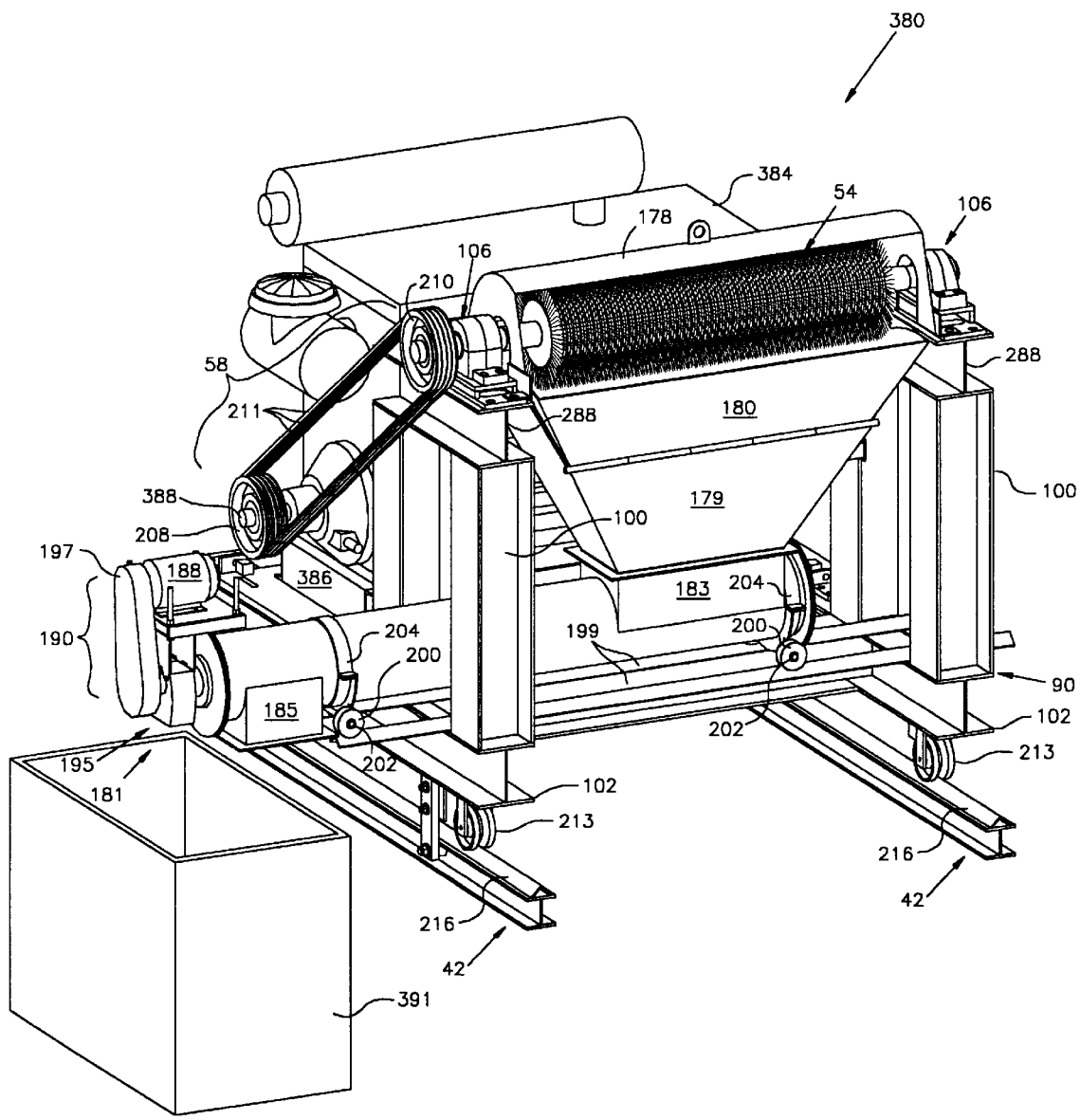

The tire-operative means and mounting structure of the second-shown version of the invention is similar to that of the first-shown version in the form of an engine driven, rolling brushing unit 380. Brushing unit 380 includes rails 42 which are affixed to an upper bed, or structural base upper level 382, overhanging and also affixed to structural bed lower level 376 of trailer 378, rather than concrete structural base upper level 218 and concrete structural base lower level 220 of such first shown version. Brushing unit 380 includes an internal combustion engine 384, preferably a diesel engine, which replaces motor 56 and which is connected to brush unit frame 90 by means of mounting brackets 386 (FIG. 28). Power is transferred from multiple belt pulley 208 attached to a power output shaft 388 of engine 384, to brush 54 by means of pulley drive 58. Retractable screw auger 181 is used in the extended position for depositing buffings beside trailer 378 into a suitable container 390 and in the retracted position fits within the width of trailer 378 such as during transport (FIG. 29).

Trailer 378 includes an engine-driven, hydraulic pump, or preferably an engine-driven, electrical generator unit 390 to power the various hydraulic or preferably electric motors used to pivot turntable 52, rotate tire holder assembly 46, move rolling brush unit 40, and rotate screw 187 of screw auger 181. Trailer 378 includes a tire resting area 392 used to hold a tire 48 during loading or unloading of the tire 48 on tire holder assembly 46. Resting area 392 is a safety feature which permits easier loading and unloading of the machine.

Figure 31:
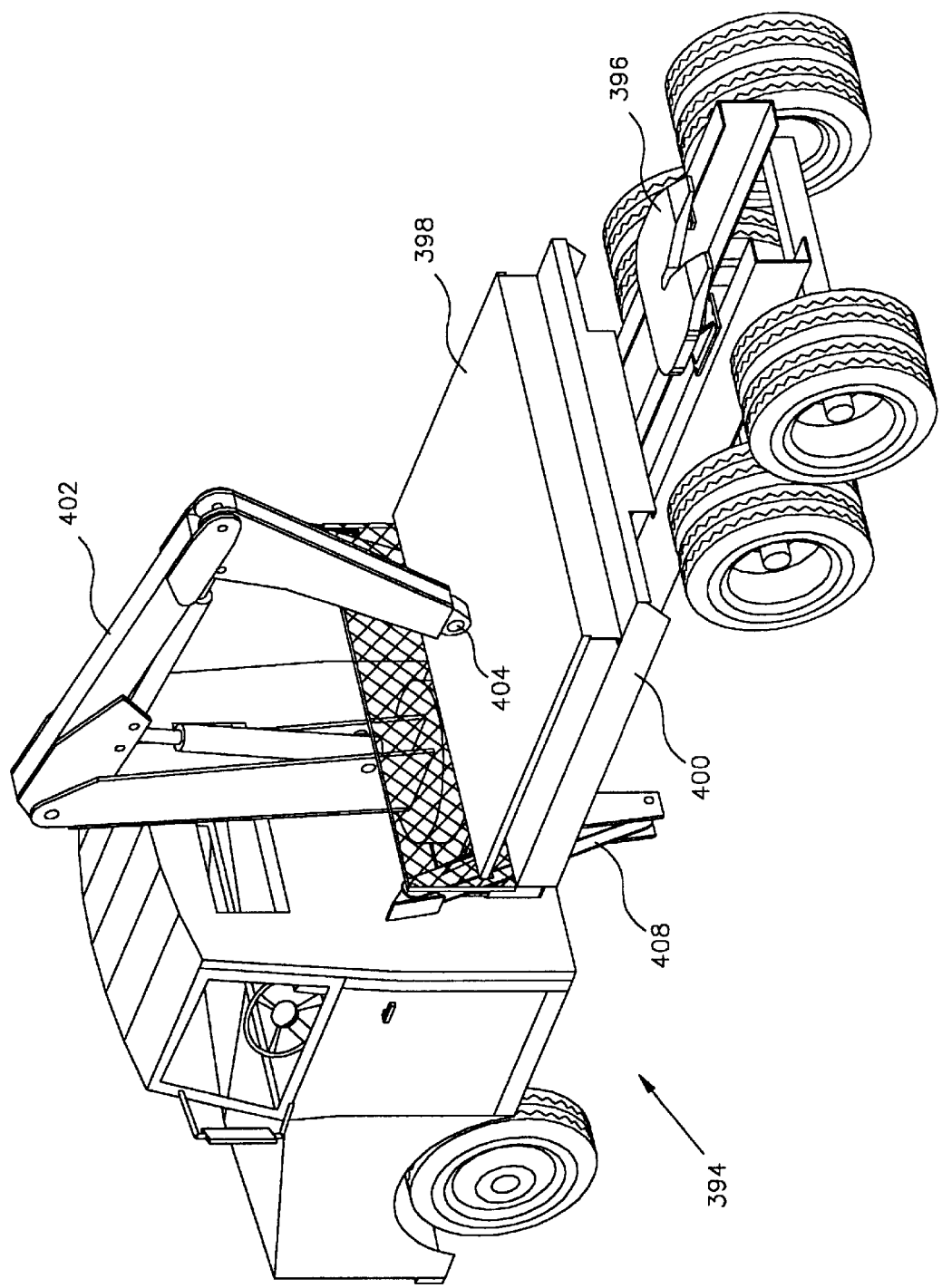

Trailer 378 is pulled by means of a fifth wheel tractor 394 having a standard type attachment disk 396 that mates with a corresponding standard-type attachment pin (not shown) on trailer 378 (FIGS. 26 and 31). A removable cover plate 398 fits over fifth wheel attachment disk 396 and functions as an extension to a fixed work platform 400, which can be used to hold a tire 48 during work thereon when trailer 378 is not connected to tractor 394. Tractor 394 also includes a standard-type, pivotable hydraulic crane 402 which operates using a hydraulic system (not shown) of the tractor. Such crane 402 has a lifting eye 404, through which a flexible strap 406 can be attached for lifting a tire 48. A pair of retractable hydraulic side stabilizer arms 408 operate using the hydraulic system of the tractor and act to stabilize tractor 394 while lifting tires 48.

Figure 32:
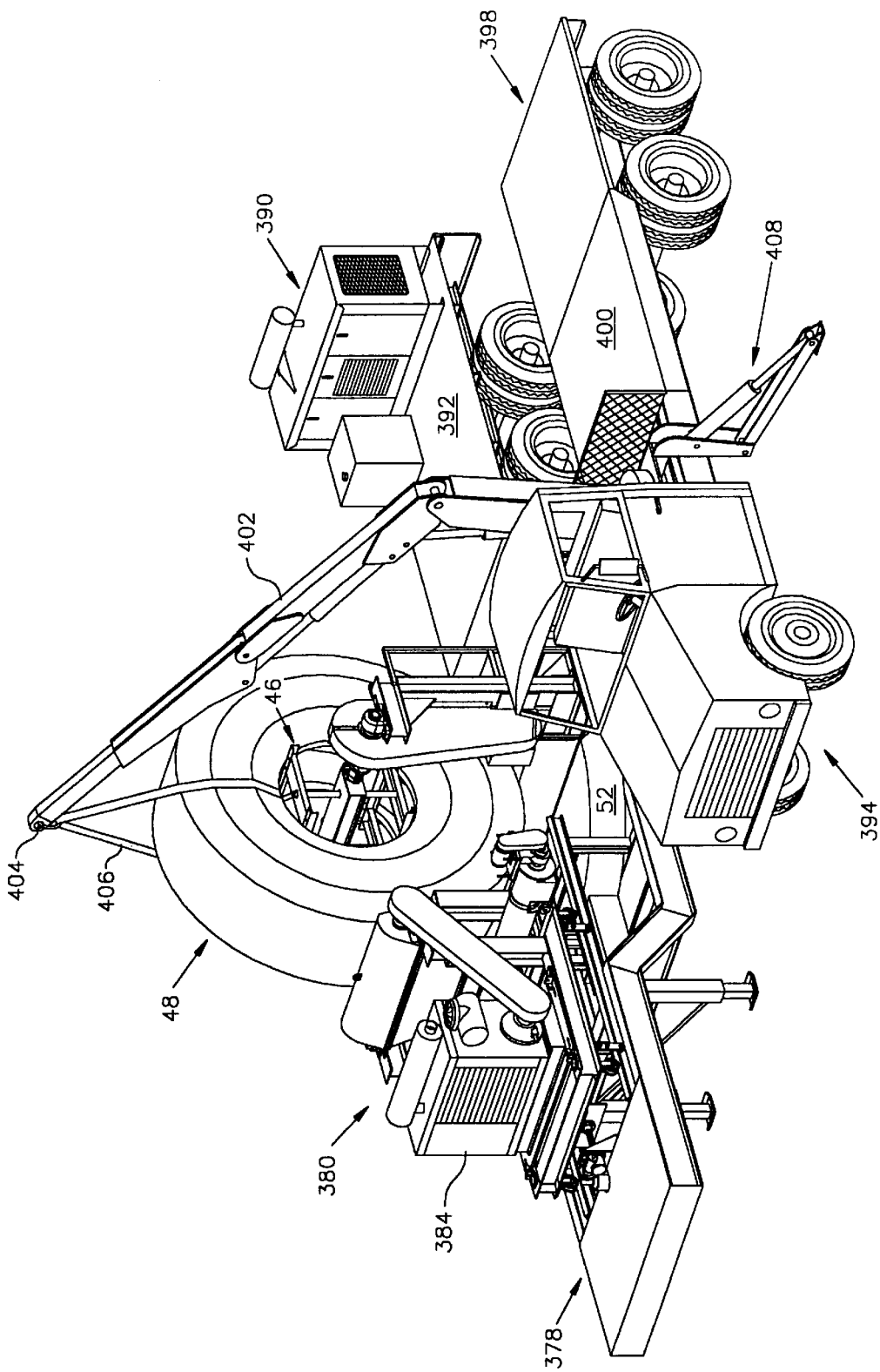

During operation of the machine, tractor 394 is positioned beside trailer 378, with side stabilizer arms 408 deployed, cover plate 398 covering fifth wheel attachment disk 396, and at such a distance that crane 402 can swing sideways over trailer 378 to load and unload tire 48 on tire holder assembly 46 (FIG. 32). Tire 48 is attached to crane 402 using one or more of straps 406 through and around tire 48 and through lifting eye 404 of crane 402, lifted to a vertical position, and placed onto tire resting area 392, wherein tire holder assembly 46 is inserted into the tire 48 and expanded to grip tire beads 72 and 74. Tire 48 and tire holding assembly 46 are then lifted onto the supporting structure frame 50 and straps 406 removed. After the work is completed, the reverse procedure is followed. During the loading and unloading procedure, tire 48 may also be rested on covers 398 and 400 of tractor 394 to facilitate such procedure. During machine operation, generator 390 supplies electrical power to operate turntable 52, rotate tire holder assembly 46, move rolling brushing unit 40, and rotate screw auger 181 while diesel engine 384 powers cutting brush 54. The machine of such second version used with the tractor-trailer rig is thus completely self-sufficient, without the necessity of using a separate crane nor outside-supplied electrical or hydraulic power.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. An apparatus for removing remaining tread material from the outer, ground-contacting portion and from the sidewalls of used vehicle tires, comprising:

tire holding means positioned on supporting structure for receiving and holding a vehicle tire and being powered so as to rotate the tire; and tire-operative means positioned on mounting structure therefor, said supporting structure and said mounting structure being operationally positionable relative to each other such that said tire-operative means can contact and remove tread material from the outer, ground-contacting portion as well as from the sidewalls of a tire held by said tire holding means.

2. An apparatus according to claim 1, wherein the tire-operative means includes a powered, rotatable, cutting brush.

3. An apparatus according to claim 2, wherein the cutting brush is elongate with radially-extending bristles which can abut or engage each other so as to maintain spaces for cooling air to flow between said bristles to aid in the dissipation of frictional heat and to maintain a generally even overall circumferential and longitudinal distribution of outer ends of said bristles for even cutting of the tread material.

4. An apparatus according to claim 3, wherein the cutting brush is of at least equal length compared to the width of the tire tread at the outer, ground-contacting portion thereof.

5. An apparatus according to claim 3, wherein the bristles can abut or engage each other by reason of being crimped along at least a portion of their lengths.

6. An apparatus according to claim 5, wherein the bristles are twisted along their lengths.

7. An apparatus according to claim 1, wherein the supporting structure for the tire holding means is pivotally mounted and the mounting structure for the tire-operative means is linearly movable.

8. An apparatus according to claim 7, wherein the tire-operative means includes an elongate, powered, rotatable, cutting brush having radially-extending bristles which can abut or engage each other so as to maintain spaces for cooling air to flow between said bristles to aid in the dissipation of frictional heat and to maintain a generally even, overall circumferential and longitudinal distribution of outer ends of said bristles for even cutting of the tread material.

9. An apparatus according to claim 7, wherein:

the tire is held by the tire-holding means in a generally vertically-oriented position and is pivotal laterally thereof; and the tire-operative means includes an elongate, powered, rotatable cutting portion oriented in a generally horizontal plane.

10. An apparatus according to claim 9, wherein the rotating cutting portion is a cutting brush.

11. An apparatus according to claim 10, wherein the cutting brush has radially-extending bristles which can abut or engage each other so as to maintain spaces for cooling air to flow between said bristles to aid in the dissipation of frictional heat and to maintain a generally even, overall circumferential and longitudinal distribution of outer ends of said bristles for even cutting of the tread material.

12. An apparatus according to claim 11, wherein the cutting brush is of at least equal length compared to the width of the tire tread at the outer, ground-contacting portion thereof.

13. An apparatus according to claim 11, wherein the bristles can abut or engage each other by reason of being crimped along at least a portion of their lengths.

14. An apparatus according to claim 13, wherein the bristles are twisted along their lengths.

15. A method of removing remaining tread material from the outer, ground-contacting portion and from the sidewalls of used vehicle tires, comprising the steps of:

removing tread material from the ground-contacting portion of the tire by a rotating cutting brush while the tire is rotated; and removing tread material from the sidewalls of the tire by said rotating cutting brush while the tire is rotated.

16. A method according to claim 15, wherein the tread material is removed simultaneously from the entire width of the outer, ground-contacting portion of the tread material by a brush of at least length compared to the outer, ground-contacting portion thereof.

17. A method according to claim 15, wherein the removal of tread material is even along the outer, ground-contacting portion thereof and wherein the tread material is prevented from reaching the melting temperature thereof by using an elongate, cutting brush having radially-extending bristles which can abut or engage each other so as to maintain spaces for cooling air to flow between said bristles to dissipate frictional heat and to maintain a generally even overall circumferential and longitudinal distribution of outer ends of said bristles for even cutting of the tread material.

18. A method according to claim 15, wherein the tire and cutting brush are moved relative to each other.

19. A method according to claim 18, wherein:

the tire is held in a generally vertically-oriented position and is pivoted laterally thereof; and the cutting brush is elongate and is oriented in a generally horizontal plane.

* * * * *